United States Patent
Sikdar

(10) Patent No.: US 7,120,121 B2
(45) Date of Patent: *Oct. 10, 2006

(54) SYSTEM, ANALYZER, AND METHOD FOR SYNCHRONIZING A DISTRIBUTED SYSTEM

(75) Inventor: Som Sikdar, San Jose, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/176,516

(22) Filed: Jun. 21, 2002

(65) Prior Publication Data

US 2002/0176448 A1    Nov. 28, 2002

Related U.S. Application Data

(63) Continuation of application No. 09/223,103, filed on Dec. 30, 1998, now Pat. No. 6,724,729.

(51) Int. Cl.
| | |
|---|---|
| *G06F 11/00* | (2006.01) |
| *G08C 15/00* | (2006.01) |
| *H04J 3/14* | (2006.01) |
| *H04L 12/26* | (2006.01) |
| *H04L 12/28* | (2006.01) |
| *H04L 12/56* | (2006.01) |

(52) U.S. Cl. ..................... 370/241; 370/390
(58) Field of Classification Search ............. 370/254, 370/255, 252, 253, 241, 390; 709/224
See application file for complete search history.

(56) References Cited

U.S. PATENT DOCUMENTS

| | | |
|---|---|---|
| 4,792,753 A | 12/1988 | Iwai |
| 4,817,080 A | 3/1989 | Soha |
| 5,101,402 A | 3/1992 | Chiu et al. |
| 5,245,231 A * | 9/1993 | Kocis et al. ............. 327/277 |

(Continued)

OTHER PUBLICATIONS

Wandel & Goltermann, "Domino Internetwork Analyzer", Communications Test Solutions, (1998) product summary.

(Continued)

*Primary Examiner*—Kevin C. Harper
(74) *Attorney, Agent, or Firm*—Workman Nydegger

(57) ABSTRACT

A method for synchronizing a distributed system is provided. The distributed system includes distributed analyzers. Each analyzer has a synchronization decoder circuit, a medium access controller, and a central processing unit. The distributed system synchronization method comprises receiving multicast information, generating local synchronization signals, receiving control data packets, and beginning processing of monitored data packets. The synchronization decoder circuit receives the multicast information, decodes the multicast information, and responsive to the multicast information, generates local synchronization signals. The decoder synchronization circuit of a first analyzer completes the decoding and the generating in a first time. The first time is adapted to enable the central processing unit of the first analyzer to start and end processing of monitored data packets at a first start time and a first end time. The first start time differs from a start time corresponding to any other analyzer by less than a maximum synchronization time. The first end time differs from an end time corresponding to any other analyzer by less than a maximum synchronization time. The maximum synchronization time comprises a parameter related to a smallest useful packet size and a network speed. The medium access controller receives control data packets. Each control data packet corresponds to a data stream. The monitored data packets are transmitted in a data stream selected for monitoring. Responsive to the local synchronization signals and the control data packets, the central processing unit for each analyzer processes monitored data packets.

42 Claims, 7 Drawing Sheets

U.S. PATENT DOCUMENTS

| | | | |
|---|---|---|---|
| 5,247,517 A | | 9/1993 | Ross et al. |
| 5,283,571 A | * | 2/1994 | Yang et al. ............ 340/825.52 |
| 5,315,580 A | | 5/1994 | Phaal ......................... 370/232 |
| 5,394,540 A | | 2/1995 | Barrington et al. |
| 5,408,469 A | | 4/1995 | Opher et al. ................ 370/399 |
| 5,408,506 A | | 4/1995 | Mincher et al. |
| 5,450,408 A | | 9/1995 | Phaal |
| 5,450,458 A | | 9/1995 | Price et al. |
| 5,457,806 A | | 10/1995 | Kitamura |
| 5,497,460 A | | 3/1996 | Bailey et al. |
| 5,504,866 A | | 4/1996 | Hirasawa |
| 5,528,516 A | | 6/1996 | Yemini et al. |
| 5,535,338 A | * | 7/1996 | Krause et al. .............. 709/222 |
| 5,544,310 A | | 8/1996 | Forman et al. |
| 5,546,540 A | | 8/1996 | White |
| 5,561,769 A | * | 10/1996 | Kumar et al. ............... 709/202 |
| 5,590,116 A | | 12/1996 | Zhang |
| 5,600,632 A | * | 2/1997 | Schulman ................... 370/252 |
| 5,602,992 A | | 2/1997 | Danneels |
| 5,666,481 A | | 9/1997 | Lewis |
| 5,668,811 A | | 9/1997 | Worsley et al. |
| 5,684,982 A | | 11/1997 | Gates |
| 5,708,778 A | | 1/1998 | Monot |
| 5,721,728 A | | 2/1998 | Fowler et al. |
| 5,724,514 A | | 3/1998 | Arias |
| 5,729,472 A | | 3/1998 | Seiffert et al. |
| 5,729,719 A | | 3/1998 | Gates |
| 5,732,218 A | | 3/1998 | Bland et al. |
| 5,742,587 A | | 4/1998 | Zornig et al. |
| 5,742,799 A | | 4/1998 | Alexander et al. |
| 5,754,552 A | | 5/1998 | Allmond et al. |
| 5,757,778 A | | 5/1998 | Kim et al. |
| 5,758,070 A | | 5/1998 | Lawrence |
| 5,787,409 A | | 7/1998 | Seiffert et al. |
| 5,799,154 A | * | 8/1998 | Kuriyan ...................... 709/223 |
| 5,887,143 A | * | 3/1999 | Saito et al. ................. 709/248 |
| 6,335,931 B1 | * | 1/2002 | Strong et al. ............... 370/390 |

OTHER PUBLICATIONS

Wandel & Goltermann, "DA-30C Internetwork Analyzer", Communications Test Solutions, (1998) product summary.
"Signal Topology and Media System Timing", Quick Reference Guide to Ethernet System, Sep. 4, 1995.
"Ethernet Frame and Ethernet Addresses", Quick Reference Guige to Ethernet System, Sep. 4, 1995.
"High-Level Protocols and Ethernet Addresses", Quick Reference Guide to Ethernet System, Sep. 4, 1995.
J. Mazza, "Fast Ethernet", Design Guidelines, pp. 1-7, Nov. 1998.
Asante Technologies, Inc., "RMON Remote Monitoring", Tech Note, (1996).
Rist, O., "RMON Rocks On", CMP Media Inc.; Internet Week, (1997).
"Fast Ethernet Overview and Deployment Guide" Intel Corporation Network Index, (1998).
"Multicast and Broadcast Addresses", Quick Reference Guide to the Ethernet System, Sep. 4, 1995.
Mansfield, G, et al., "An SNMP-Based Expert Network Management System", Institute of Electronics Information and Comm., Aug. 1, 1992, pp. 701-707.
Mansfield G. et al., "Network Management In A Large-Scale OSI-based Campus Network" Network Operations and Management Symposium, 1992; pp. 566-578.

* cited by examiner

SYSTEM, ANALYZER, AND METHOD FOR SYNCHRONIZING A DISTRIBUTED SYSTEM

CROSS-REFERENCE TO RELATED PATENT APPLICATIONS

This application is a continuation of U.S. patent application Ser. No. 09/223,103, "System, Analyzer, and Method for Synchronizing a Distributed System," by Som Sikdar, filed Dec. 30, 1998 now U.S. Pat. No. 6,724,729. The disclosure of which is incorporated herein by reference.

BACKGROUND OF THE INVENTION

1. Field of Invention

The invention relates generally to network analyzers, and more specifically to synchronizing distributed systems for monitoring and analysis.

2. Description of Related Art

Local Area Network (LAN) analysis instruments are used to measure, characterize and test data streams on LAN systems. A prior art analyzer can have a control port that allows a remote entity, typically a personal computer (PC) executing the appropriate analysis software, to control the analyzer. The connection between the PC and the analyzer is usually a physical communications link, such as an RS-232 (presently referred to as an EIA/TIA 232) serial port, or a 10/100 megabits per second Ethernet link.

Certain tests, using test systems including two or more LAN analyzers, require that a test be started and stopped on multiple system analyzers at the same time. This requirement ensures that the data gathered from multiple data streams can be correlated together. Moreover, the internal timers of the multiple analyzers need to be synchronized together to ensure that time references from multiple measurements can be correlated.

Prior art systems for synchronization of distributed network analyzers include special and distinct cabling to provide the appropriate electrical signals between analyzers in a collection of analyzers for a particular network. The prior art cabling is also designed for specific analyzer requirements. For example, the Wandel & Goltermann Technologies, Inc., (located in Research Triangle Park, N.C.) DA-30 network analyzer provides clock synchronization and counter coordination by placing two analyzers in the same cabinet with the controller computer. The controller computer's clock is used to run both analyzers.

The network analyzers described in U.S. Pat. Nos. 5,535,193 and 5,590,116 operate most effectively when a bus, completely separate from the network to be analyzed, interconnects the analyzers. The bus for these systems preferably comprises several multiconductor computer cables that extend between parallel ports on each analyzer and the compatible port of the control computer, forming a daisy-chain parallel connection.

One disadvantage of the prior art occurs for daisy-chained, or bussed analyzers because these configurations place a limit on the number of analyzers that can be physically connected. For example, certain bus structures such as Small Computer System Interface (SCSI) buses, or IEEE 488 instrumentation buses limit the number of analyzers based on current drive and voltage limitations. For example, SCSI buses typically accommodate no more than eight analyzers. Prior art systems also typically use separate cables for control and clock information.

SUMMARY OF THE INVENTION

One aspect of the invention provides a method for synchronizing a distributed system. The distributed system includes synchronized analyzers and data streams. The distributed system supports multicast communications. The method includes selected synchronized analyzers receiving multicast information and communication packets. Each selected synchronized analyzer has processing resources including a synchronization decoder circuit, and one or more packet capture, analysis and generation circuits. The multicast information includes destination data corresponding to addresses of the selected synchronized analyzers. The synchronization decoder circuit decodes the multicast information. Responsive to the multicast information, the synchronization decoder circuit generates local signals. The synchronization decoder circuit transfers the local signals to one or more selected packet capture, analysis and generation circuits (PCAGC's).

In some embodiments, the synchronization decoder circuit receives the multicast information. For some of these embodiments, the synchronized analyzer processing resources include a medium access controller having a first data link layer address, and a central processing unit receiving the communications packets through the medium access controller. The synchronization decoder circuit has a second data link layer address. The first data link layer address differs from the second data link layer address.

In some embodiments, the data streams comprise transmitted data packets and include monitored data streams selected for analysis at one or more monitored analysis locations. The method includes, responsive to the local signals and the communication packets, the selected PCAGC's beginning processing of monitored data packets from monitored data streams at a start time. For some of these embodiments, the processing is adapted to analyze and manage the distributed system.

For some of the embodiments where the selected PCAGC's begin processing, the method includes the selected PCAGC's: capturing received monitored data packets at a monitored data receipt time, and labeling portions of the received monitored data packets with time-stamps to form time-stamped portions. The time-stamps correspond to the monitored data receipt times. The processing of the monitored data packets includes the selected PCAGC's: analyzing the time-stamped portions, the analyzing including generating analysis data, and storing segments of the time-stamped portions and corresponding analysis data in a memory. For some of these embodiments, the distributed system includes a control unit adapted to transmit the multicast information, and the method includes the selected PCAGC's transmitting analysis information corresponding to the analysis data to the control unit.

In some embodiments, the multicast information includes synchronization packets and control packets, and the local signals include synchronization signals and control signals. In some embodiments, the distributed system has analysis locations disposed in the data streams, and each of the selected packet capture, analysis and generation circuits is connected to one or more monitored analysis locations.

In some embodiments, the synchronization decoder circuit of a first selected synchronized analyzer receives the multicast information at a first multicast receipt time. The selected synchronized analyzers are adapted to ensure that the first multicast receipt time differs from the multicast receipt time corresponding to any other selected synchronized analyzer by no more than a maximum synchronization time. The maximum synchronization time comprises a parameter related to a smallest useful packet size and a network speed. The maximum synchronization time is less than approximately one microsecond. For some of these embodiments, the method further includes, responsive to the multicast information and the communication packets, the selected PCAGC's completing a first process for a first set of monitored data packets, the completing for each selected synchronized analyzer occurring at an end time.

In some embodiments, the synchronized analyzer processing resources include a central processing unit. The method includes the central processing unit receiving the communication packets. Responsive to the communication packets, the central processing unit generates commands; and the central processing unit sends the commands to the PCAGC's.

In some embodiments, the distributed system includes a control unit and a first network link. The first network link connects the control unit to the synchronized analyzers and connects the synchronized analyzers to each other. The synchronized analyzer includes a medium access controller. The method includes the control unit transmitting the multicast information through the first network link to the selected synchronized analyzers, and the control unit transmitting the communications packets through the first network link and the medium access controller to the central processing units of the selected synchronized analyzers. In other words the first network link is reused for transferring the multicast information, thereby avoiding the use of extra cabling for synchronization and control packet communication. For some of these embodiments, the control unit comprises a separate control computer. In other embodiments, the control unit comprises a master analyzer.

In some embodiments, the distributed system comprises an IEEE 802 compliant communications network.

In some embodiments, the decoding and generating local signals steps are accomplished in a decoder delay time. The variation of the decoder delay time between selected synchronized analyzers is less than approximately five percent of the decoder delay time. For some of these embodiments, the selected PCAGC's of a first selected synchronized analyzer start processing the monitored data packets at a first start time. The first start time differs from a start time corresponding to any other selected synchronized analyzer by no more than a maximum synchronization time. The maximum synchronization time comprises a parameter related to a smallest useful packet size and a network speed, and the maximum synchronization time is less than approximately one microsecond. For some of these embodiments, the decoder synchronization circuit of a first selected synchronized analyzer transfers the local signals to the selected PCAGC's of the first synchronized analyzer at a first transfer time ($t_3$). The selected synchronized analyzers are adapted to ensure that the first transfer time differs from the transfer time corresponding to any other of the selected synchronized analyzers by no more than a maximum synchronization time.

A second aspect of the invention provides a synchronized analyzer for synchronizing a distributed system. The synchronized analyzer comprises a synchronization decoder circuit and one or more packet capture, analysis and generation circuits. The synchronization decoder circuit has processing resources adapted to receive and decode multicast information. Responsive to the multicast information, the synchronization decoder circuit processing resources are adapted to generate local signals. The packet capture, analysis and generation circuits processing resources are adapted to receive the local signals at signal receipt times. Responsive to local signals addressed to one or more selected packet capture, analysis and generation circuit processing resources, the processing resources thereof are adapted to capture portions of monitored data packets at monitored data receipt times. The monitored data packets are transmitted in monitored data streams. The monitored data streams are disposed in the distribution system and selected for analysis. The packet capture, analysis and generation circuits processing resources are also adapted to process the portions of the monitored data packets, the processing of the portions of the monitored data packets adapted to analyze and manage the distributed system.

In some embodiments, the synchronized analyzer includes a central processing unit having processing resources adapted to receive communication packets from a control unit disposed in the distributed system. Responsive to the communication packets, the central processing unit processing resources generate commands; and transfer the commands to the PCAGC's. The local signals and the commands control the processing of the monitored data packets. For some of these embodiments, the distributed system includes a plurality of synchronized analyzers, a control unit having processing resources adapted to generate and transmit the multicast information, and a first network link connecting the control unit to the synchronized analyzers, and connecting the synchronized analyzers to each other. The synchronized analyzer includes a medium access controller. The central processing unit processing resources are adapted to receive communications packets from the control unit through the first network link and the medium access controller.

In some embodiments, the distributed system includes a control unit having processing resources adapted to generate and transmit the multicast information, and a first network link connecting the control unit to the synchronized analyzers, and connecting the synchronized analyzers to each other. The synchronization decoder circuit processing resources are adapted to receive the multicast information from control unit via the first network link;

In some embodiments, the distributed system comprises an IEEE 802 compliant communications network.

In some embodiments, the multicast information includes destination data corresponding to addresses of selected analyzers. The synchronized analyzer includes a medium access controller having a first data link layer address, and a central processing unit receiving data through the medium access controller. The synchronization decoder circuit has a second data link layer address, and the destination data corresponds to the second data link layer address. The first data link layer address differs from the second data link layer address.

In some embodiments, the synchronized analyzer comprises a single monitored analysis location synchronized analyzer having one or more PCAGC's including processing resources adapted to capture monitored data packets from a single monitored analysis location. In other embodiments, the synchronized analyzer comprises a multiple monitored analysis location analyzers having a plurality of PCAGC's. The plurality of PCAGC's have processing resources adapted to capture monitored data packets from a plurality of monitored analysis locations.

In some embodiments, the PCAGC's include processing resources adapted to label portions of the received monitored data packets with time-stamps to form time-stamped portions. The time-stamps correspond to the monitored data receipt times. The processing of the monitored data packets includes analyzing the time-stamped portions, the analyzing including generating analysis data, and storing segments of the time-stamped portions and corresponding analysis data in a memory. For some of these embodiments, the distributed system includes a control unit having processing resources adapted to generate and transmit the multicast information; and a first network link connecting the control unit to the synchronized analyzers, and connecting the synchronized analyzers to each other. The PCAGC processing resources are adapted to transmit analysis information corresponding to the analysis data to the control unit.

In some embodiments, the PCAGC's have processing resources adapted to complete a first process for a first set of monitored data packets at a corresponding end time in response to the multicast information and the communication packets.

In some embodiments, the decoder synchronization circuit processing resources are adapted to decode the multicast information and generate the local signals within a decoder delay time, the variation of the decoder delay time between synchronized analyzers is less than approximately five percent of the decoder delay time.

In some embodiments, the synchronized analyzer comprises a master analyzer including processing resources adapted to transmit the multicast information to synchronized analyzers connected to the master analyzer.

A third aspect of the invention provides a system for synchronization of a distributed analysis system. The synchronization system includes data streams comprising transmitted data packets, a control unit, synchronized analyzers, and a first network link. The control unit has processing resources adapted to transmit multicast information. The synchronized analyzers are according to the second aspect of the invention. The first network link connects the control unit to the synchronized analyzers and the synchronized analyzers to each other. The control unit processing resources transmit the multicast information to the synchronized analyzers through the first network link.

In some embodiments, the distributed system has analysis locations disposed in the data streams; and each packet capture, analysis and generation circuit connected to one or more of the analysis locations. In some embodiments, the distributed system comprises an Ethernet local area network and the first network link comprises an Ethernet repeater. In some embodiments, the distributed system comprises an IEEE 802 compliant communications network. In some embodiments, the distributed system comprises a fiber distributed data interface network.

In some embodiments, the multicast information includes destination data corresponding to the addresses of selected synchronized analyzers. The synchronized analyzers include medium access controllers having first data link layer addresses, and central processing units receiving data through the medium access controller. The synchronization decoder circuits have second data link layer addresses, and the destination data corresponds to the second data link layer address. The first data link layer addresses differ from the second data link layer addresses.

In some embodiments, the packet capture, analysis and generation circuits include processing resources adapted to label portions of the received monitored data packets with time-stamps to form time-stamped portions. The time-stamps corresponding to the monitored data receipt times. The processing of the monitored data packets includes analyzing the time-stamped portions, the analyzing including generating analysis data, and storing segments of the time-stamped portions and corresponding analysis data in a memory. For some of these embodiments, the control unit includes processing resources adapted to generate the multicast information. The packet capture, analysis and generation circuit processing resources are adapted to transmit analysis information corresponding to the analysis data to the control unit.

In some embodiments, the decoder synchronization circuit processing resources are adapted to decode the multicast information and generate the local signals steps within a decoder delay time, the variation of the decoder delay time between synchronized analyzers is less than approximately five percent of the decoder delay time.

In some embodiments, the decoder synchronization circuit processing resources of a first synchronized analyzer receive the multicast information at a first multicast receipt time ($t_1$). The synchronized analyzers are adapted to ensure that the first multicast receipt time differs from the multicast receipt time corresponding to any other synchronized analyzer in the distributed system by no more than a maximum synchronization time.

In some embodiments, one of the synchronized analyzers comprises a master analyzer including processing resources adapted to transmit the multicast information to synchronized analyzers connected to the master analyzer.

These, and other, goals and aspects of the invention will be better appreciated and understood when considered in conjunction with the following description and the accompanying drawings. It should be understood, however, that the following description, while indicating specific embodiments of the invention and numerous specific details thereof, is given by way of illustration and not of limitation. Many changes and modifications may be made within the scope of the invention without departing from the spirit thereof, and the invention includes all such modifications.

DETAILED DESCRIPTION

The invention and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the invention in detail.

A method for synchronizing a distributed system is provided. Also provided are synchronized analyzers adapted to perform the method, and a synchronizing system for implementing the method.

Distributed systems are networks that provide transparent user access to a plurality of autonomous computers. In a distributed system, when a user types a command to run a program, the operating system response is to select the best processor to run the program, find and transport input files to an appropriate processor, and place the results in an appropriate location. On the other hand, for networks that are not distributed systems, a user must explicitly log onto one machine, explicitly submit jobs from a remote device, explicitly move files, and generally handle all the network management. For a distributed system, none of the network management actions are performed explicitly by the user; the actions are automatically performed by the distributed system without the user's knowledge. Therefore, analysis of a distributed system can also be accomplished without the user's knowledge, and in a manner that does not perceptibly slow the user's communications on the network.

Figure 3:
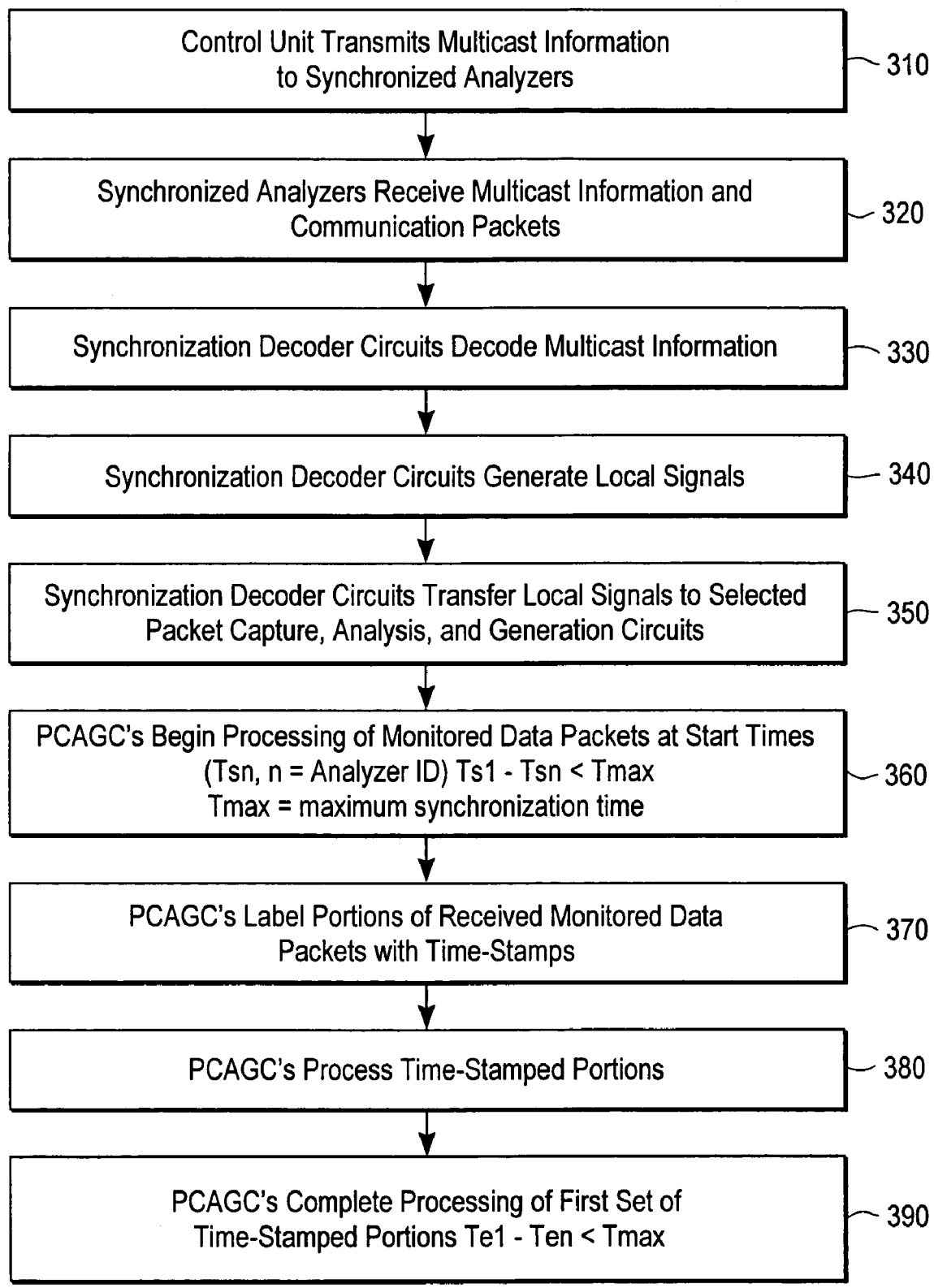
FIG. 3 is a flow diagram representation of a method for synchronizing a distributed system according to one embodiment of the invention.
Figure 4:
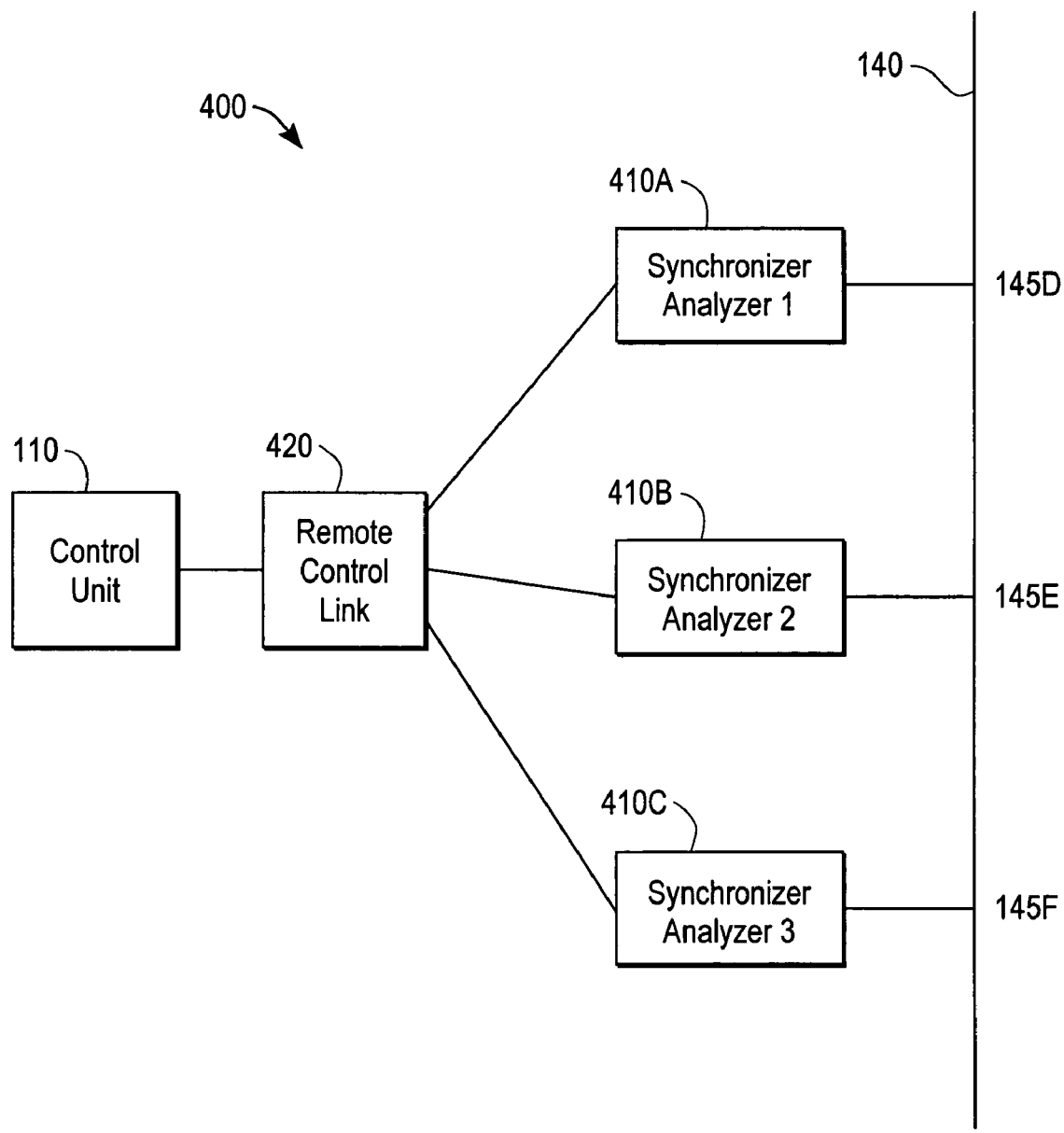
FIG. 4 illustrates a synchronizing system according to one embodiment of the invention.

The method for synchronizing a distributed system 300 is shown in FIG. 3 and includes multicast transmission of information to one or more synchronized analyzers, such as the first synchronized analyzer 410A shown in FIG. 4. The multicast information typically includes synchronization and control information and is typically transmitted from a control unit 110 as shown in FIG. 4. Synchronization information, control information, and communication signals are transmitted through the same first network link, shown in FIG. 4 as a remote control link 420. For a remote control link 420 using Ethernet, Fiber Distributed Data Interface (FDDI), token ring protocol, or any other IEEE 802 compliant protocol, the information and communication signals are transmitted as packets of data.

Figure 1:
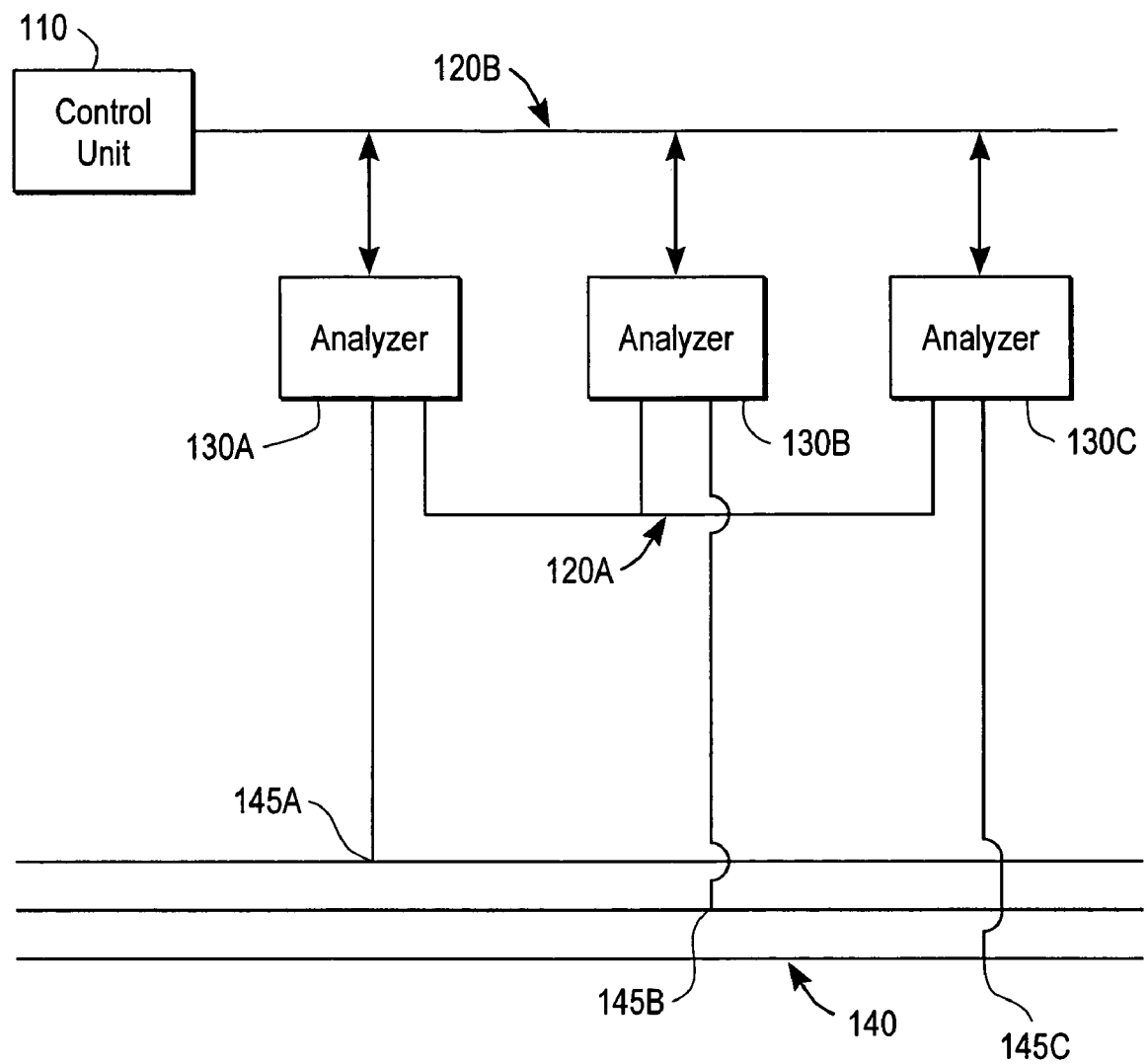
FIG. 1 illustrates a distributed system synchronized according to the prior art.

In prior art LAN analysis systems, such as that shown in FIG. 1, the control unit 110 is connected to an interconnecting bus. The interconnecting bus extends to all the LAN analyzers involved in a test, e.g., 130A through 130C in FIG. 1. The first interconnecting bus portion 120A connecting the LAN analyzers to each other is typically completely physically separate from the second interconnecting bus portion 120B connecting the control unit 110 with the analyzers. Note also for the prior art system for synchronizing 100 a distributed system, each analyzer corresponds to a particular data monitoring location. For example, the first LAN analyzer 130A monitors and analyzes data from a first data monitoring location 145A. The second LAN analyzer 130B monitors and analyzes data from a second data monitoring location 145B, and the third LAN analyzer 130C monitors and analyzes data from a third data monitoring location 145C.

Figure 6:
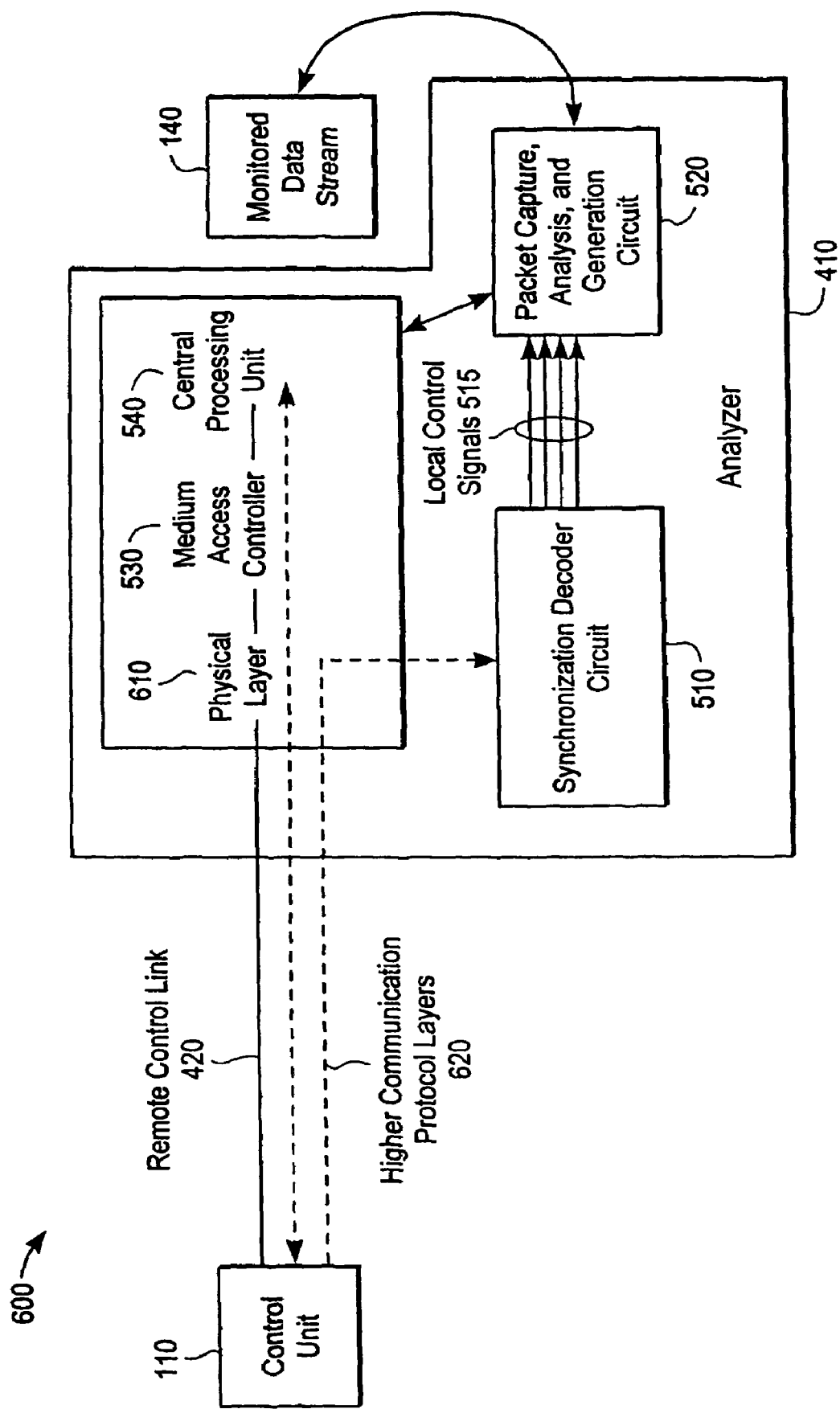
FIG. 6 illustrates the separation of the synchronized analyzer components for communication protocol layers above the physical layer for one embodiment of the invention.

Analysis systems for distributed systems according to the present invention do not use a separate bus or cabling to connect the analyzers to each other, or to connect the analyzers with the control unit 110. Instead these connections are accomplished by reusing the network, and through the use of multicast transmission of information, according to the IEEE 802 communications network standard, from the control unit 110 to the appropriate synchronized analyzers 410, as shown in FIG. 6.

Multicast Packet Receipt Window

Figure 2:
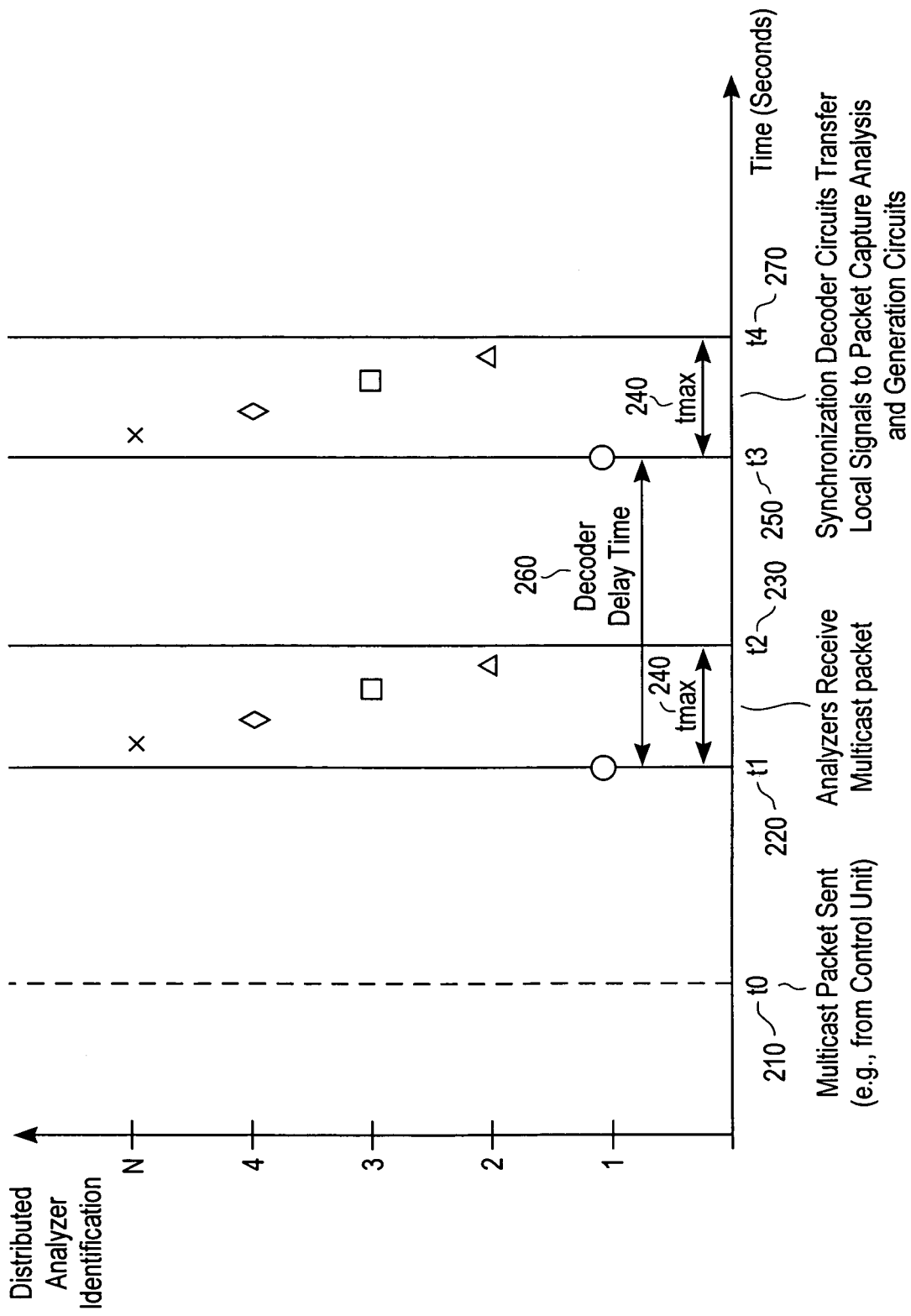
FIG. 2 illustrates a time sequence of key analysis events for a number of synchronized analyzers in a distributed system according to one embodiment of the invention.

For purposes of the invention, "simultaneous" means the scope of time within which a group of synchronized analyzers 410 in a distributed system need to be synchronized to effectively perform their analysis and monitoring functions. This scope of time is referred to alternatively as the maximum synchronization time 240—as shown in FIG. 2, or the "multicast packet receipt window". The value of the maximum synchronization time depends on the data that is processed, the nature of the analysis processing, and the speed of the network.

For example, when analyzing Fast Ethernet Local Area Networks (LANs), the maximum synchronization time typically is less than approximately one microsecond because the time required to process the smallest useful analysis packet is less than one microsecond. In one example, a Fast Ethernet LAN has a speed of one hundred (100) megabits per second. The smallest Ethernet packet that can be used by a LAN protocol analyzer includes eight bytes of preamble and one byte of frame content, or nine total bytes [i.e., seventy-two (72) binary digits (bits)]. For this example, the maximum synchronization time 240 is seven hundred twenty (720) nanoseconds. The maximum synchronization time 240 for a set of synchronized analyzers 410 on a given IEEE 802 compliant network is determined according to the following equation:

$$t_{max} = b/s$$

where $t_{max}$ is the maximum synchronization time, b is the smallest packet size in bits that is useful for the analyzer, and s is the speed of the network.

Other formulas for obtaining the maximum synchronization time for networks other than Ethernet networks, such as token ring or Fiber Distributed Data Interface (FDDI) can be derived based on key parameters for those networks. For example, given an FDDI network having a speed of one gigabit per second, and a minimum analysis packet size of twenty-two bytes or one hundred seventy-six (176) bits, the maximum synchronization time 240 for the network is one hundred seventy-six (176) nanoseconds based on the equation $t_{max} = b/s$.

Distributed System Synchronization Method

One aspect of the invention is a method for synchronizing a distributed system. A method for synchronizing a distributed system 300 according to one embodiment of the invention is shown in FIG. 3. The distributed system has synchronized analyzers and data streams. The distributed system supports multicast communications.

Figure 5:
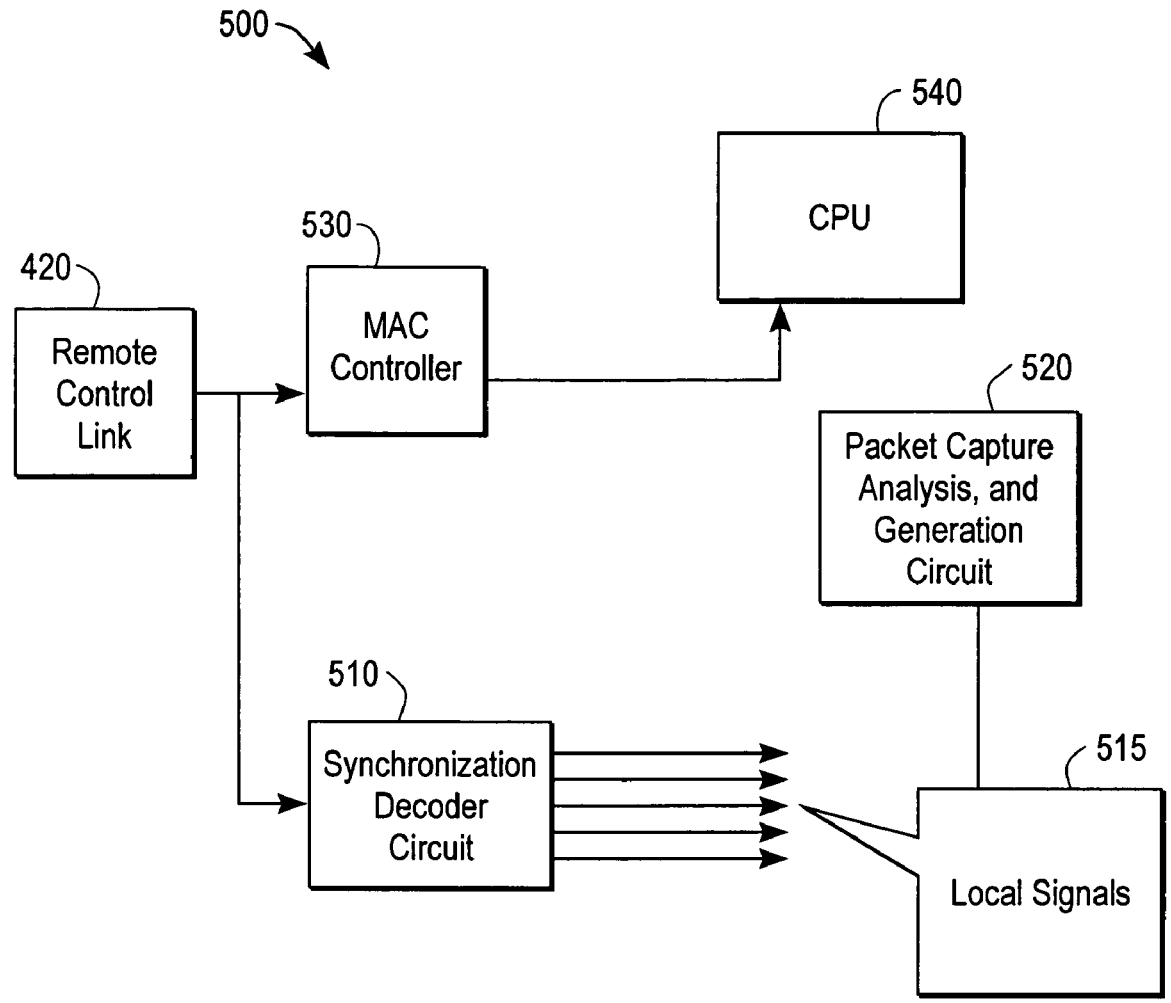
FIG. 5 illustrates the segregation of synchronized analyzer tasks according to one embodiment of the invention.

The logic block required to perform the method for synchronizing a distributed system 300 is referred to as a "Distributed Synchronization Architecture (DSA)", and includes a synchronization decoder circuit 510, as shown in FIG. 5. The synchronization decoder circuit 510 is typically attached to the synchronized analyzer management port. The multicast information is typically received by the synchronization decoder circuit 510. In some embodiments the logic circuits in the synchronization decoder circuit 510 are incorporated into a field programmable gate array, either flash memory based or hardwired.

A timing sequence for some key analysis events 200 according to one embodiment of the method for synchronizing a distributed system 300 is illustrated in FIG. 2. A synchronization system 400 using the method for synchronizing a distributed system 300 is shown in FIG. 4.

The segregation synchronized analyzer 410 tasks 500 for one embodiment of the invention is shown in FIG. 5. FIG. 6 provides an illustration of the higher communication protocol layer separation of the synchronized analyzer 410 components 600. As discussed above, the method for synchronizing a distributed system 300 can be used for a variety of high-speed communication networks.

With reference to FIG. 2, the completion times for various tasks performed by the first, second, third, fourth, and Nth synchronized analyzers are indicated respectively by the circular, triangular, square, diamond, and "X" symbols.

The method for synchronizing a distributed system 300 includes selected synchronized analyzers 410 receiving 320 multicast information and communication packets. Each selected synchronized analyzer 410 has processing resources including a synchronization decoder circuit 510, and one or more packet capture, analysis and generation circuits 520, otherwise referred to herein as "PCAGC's". The multicast information includes destination data corresponding to addresses of the selected synchronized analyzers 410. In some embodiments, the decoder synchronization circuits 510 receive the multicast information. However, for other embodiments, a different portion of the synchronized analyzer 410 can be used for receipt of the multicast information.

For some of the embodiments where the decoder synchronization circuits 510 receive the multicast information, the synchronized analyzer 410 processing resources include a medium access controller 530 having a first data link layer address, and a central processing unit 540 receiving the communications packets through the medium access controller 530. The central processing unit 540 in one embodiment is a MIPS 4650 CPU. The synchronization decoder circuit 510 has a second data link layer address. The first data link layer address differs from the second data link layer address. The destination data corresponds to the second data link layer address.

For selected synchronized analyzers 410, the synchronization decoder circuit 510 decodes 330 the multicast information. Responsive to the multicast information, the synchronization decoder circuit generates 340 local signals. The local signals 515 are shown in FIG. 5 as an output of the synchronization decoder circuit 510. The synchronization decoder circuit 510 transfers 350 the local signals 515 to one or more selected packet capture, analysis and generation circuits 520. For some embodiments, the local signals 515 include synchronization signals and control signals. Examples of local signals include a system reset signal, a receive enable signal, a transmit enable signal, a clear time stamp signal, and a remote trigger signal.

In some embodiments the distributed system includes a control unit 110 and a first network link, shown in FIG. 4 as a remote control link 420. The control unit 110 can be a separate control computer, or one of the synchronized analyzers 410 can act as a master analyzer and perform the control unit 110 functions. Note however, that the multicast information can, in other embodiments, be transferred to the synchronized analyzers 410 by other devices connected thereto.

In some embodiments, the remote control link 420 connects the control unit 110 to the synchronized analyzers 410, and connects the synchronized analyzers 410 to each other. The synchronized analyzers 410 include a central processing unit 540, and a medium access controller 530, as shown in FIG. 5. In some embodiments, the remote control link 420 comprises a media independent interface which provides a standard interface between a carrier sense multiple access/collision detection medium access controller 530 and a variety of media specifications including 100BASE-FX, 100BASE-T4, and 100BASE-TX.

For some embodiments, as illustrated in the segregation of synchronized analyzer 410 tasks 500 shown in FIG. 5, the method for synchronizing a distributed system 300 includes the control unit 110 transmitting 310 the multicast information through the remote control link 420 to the selected synchronized analyzers 410. The control unit 110 also transmits the communications packets through the remote control link 420 and the medium access controller 530 to the central processing units 540 of the selected synchronized analyzers 410. For some of these embodiments, the control unit 110 starts the synchronization method 300 by transmitting 310 multicast information to the synchronized analyzers 410 at time $t_0$ 210.

The multicast information typically includes a single data stream of packets addressed for receipt by the selected synchronized analyzers 410. The selected synchronized analyzers 410 have destination addresses, e.g., second data link layer addresses, that typically correspond to the appropriate multicast group.

The selected synchronized analyzers 410 having the appropriate destination addresses receive 320 the multicast information packets as the packets progress across the remote control link 420 and also receive corresponding communication packets. Because only selected synchronized analyzers 410 process the multicast packets, multicasting provides efficient reception of the packets for members of the multicast group, and allows nonmember analyzers to avoid unnecessary processing of packets not intended for their receipt.

In some embodiments, the distributed system comprises an Ethernet network including a remote control link 420 connecting the synchronized analyzers 410 to the control unit 110 and the synchronized analyzers 420 to each other. The remote control link 420 for some of these embodiments comprises an Ethernet repeater. In the case of a fast Ethernet LAN with a seventy-two (72) bit minimum analyzer packet size, the maximum synchronization time of seven hundred twenty (720) nanoseconds can be accomplished using a separate fast Ethernet repeater to interconnect the synchronized analyzers 410 to each other and to the control unit 110. Note that the Ethernet repeater provides the multicast packets to the selected synchronized analyzer 410 synchronization decoder circuits 510 within the time it takes to process two bytes, or approximately one hundred sixty (160) nanoseconds. Therefore, for the Ethernet repeater of this example, the time elapsed between the time, $t_0$ 210, when the multicast packet is sent from the control unit 110 and the time, $t_1$ 220, when the first synchronized analyzer 410 completes reception of the multicast packet is approximately one hundred sixty (160) nanoseconds. The invention thereby provides 160-nanosecond synchronization window that meets the maximum synchronization requirement of 720 nanoseconds for the 100 Mbps fast Ethernet LAN by a wide margin.

As shown in FIG. 4, the multicast information can be transmitted to a select group of recipients, such as any selected combination of the synchronized analyzers 410. For some embodiments, the multicast packets can include synchronization packets and control packets. For these embodiments, the synchronization and control packets can be sent to the synchronized analyzers 410 from the control computer 110 via a first network (remote control) link 420 such as an Ethernet LAN link.

Synchronization decoder circuitry 510, attached to each analyzer receiver, decodes 330 the synchronization and control packets and generates 340 local signals 515. The use of separate decoder circuitry 510 minimizes the time difference between when the various analyzers 410 in the system receive the packets, i.e., the maximum synchronization time 240.

The data streams can comprise transmitted data packets and can include monitored data streams 140 selected for analysis at one or more monitored analysis locations. Each synchronized analyzer 410 corresponds to one or more monitored analysis locations in a data communication network. For example a synchronized analyzer 410 can fetch a monitored data packet as the packet is transmitted from a work station to a LAN link by connecting the synchronized analyzer 410 to a coaxial cable at a location between the work station and the LAN link. However, monitoring software can enable a single synchronized analyzer 410 to cover more than one monitored analysis location, and can enable more than one synchronized analyzer 410 to extract information from a single monitored analysis location.

In FIG. 4, the first synchronized analyzer 410A fetches monitored data packets from a first synchronized analyzer monitored analysis location 145D, the second synchronized analyzer 410B fetches monitored data packets from a second synchronized analyzer monitored analysis location 145E, and the third synchronized analyzer 410C fetches monitored data packets from a second synchronized analyzer monitored analysis location 145F.

In some embodiments, any communications link in compliance with IEEE 802, including Ethernet, FDDI, or token ring links, can be used for remote control link 420 between the control unit 110 and the synchronized analyzers 410.

Communication packets are transferred over the remote control link 420 among the synchronized analyzers 410, and between the synchronized analyzers 410 and the control unit 110, to enable the control unit 110 (or a synchronized analyzer 410) to perform cooperative analysis comparing the individual analysis results for one or more of the synchronized analyzers 410.

According to some embodiments of the invention, the remote control link 420 is used for exchanging communication packets, synchronization information, and control information. In prior art analysis systems, the synchronization packets and the control packets are transmitted over a connection physically separated from the connection used for the communication packets.

The present invention is adapted to use the remote control link 420 used to exchange communication packets to also transmit control packets and synchronization packets from the control unit 110 to the synchronization decoder circuits 510 of the synchronized analyzers 410. The system for synchronizing a distributed system 400 thereby builds on top of the existing network (Ethernet FDDI, token ring, etc.) connection for communication packets to eliminate the separate synchronization and control cabling (or buses) found in the prior art.

Although, different synchronized analyzers 410 complete receiving 320 the multicast information (i.e., packet) at different times, the use of the decoder synchronization circuits 510 and the multicast information enabled the time differences to be minimized so that the analyzers perform required tasks "simultaneously" for purposes of monitoring and analysis.

In some embodiments, the decoder synchronization circuit 510 of a first selected synchronized analyzer 410 receives the multicast information at a first multicast receipt time ($t_1$ 220). The selected synchronized analyzers 410 are adapted to ensure that the first multicast receipt time differs from the multicast receipt time corresponding to any other selected synchronized analyzer 410 by no more than a maximum synchronization time 240. The maximum synchronization time 240 comprises a parameter related to a smallest useful packet size and a network speed, and the maximum synchronization time is less than approximately one microsecond.

For example as shown in FIG. 2, a first synchronized analyzer 410, completes reception of the multicast packet before any of the other synchronized analyzers 410, at a time $t_1$ 220. The "last" synchronized analyzer completes reception of the multicast packet at a time no later than $t_2$ 230. Because the multicast packets are physically transmitted over the same remote control link 420 used for communication packets instead of over a separate bus or cabling, the maximum difference between the multicast packet reception completion time of the first analyzer and any other analyzer (e.g., the last analyzer) equals the maximum synchronization time 240. In many circumstances, and as shown by the left triangle on FIG. 2, the last synchronized analyzer 410 completes receiving 320 the multicast packet before the maximum synchronization time 240 elapses.

The remote control link 420 between the synchronized analyzers 410 and the control unit 110 can be an Ethernet local area network (LAN) interface. The remote control link 420 can be an Ethernet repeater. The distributed system has monitored data streams 140.

The next step in the method for synchronizing a distributed system 300 comprises the synchronization decoder circuit 510 decoding 330 the multicast information. Then, the synchronization decoder circuit 510 generates 340 local signals. In some embodiments, the synchronized analyzer 410 processing resources include a central processing unit (CPU) 540. For some of these embodiments, the CPU 540 has a different destination address than the synchronization decoder circuit 510 for higher communication protocol (or software) layers 620, than the physical layer 610, as shown in FIG. 6. For these embodiments, the separately addressed synchronization decoder circuit 510 provides rapid decoding 330 of the multicast information and generation 340 of the local signals.

For these embodiments, the receiving port data link layer address of each synchronization decoder circuit 510 is such that communication packets are not passed to the synchronization decoder circuit 510. Instead, the only signals that are received by the synchronization decoder circuit 510 are the multicast packets having a destination address to which the synchronization decoder circuit 510 for a particular synchronized analyzer 410 will latch up.

Medium access controllers 530 generally use memory shared by the analyzer CPU 540. Therefore, the maximum synchronization time for a distributed analysis system which transfers control packets and synchronization packets through an analyzer's medium access controller would depend on additional factors, e.g., beyond those in the $t_{max}$=b/s equation. Such additional factors include the speed of the shared memory, the central processing unit 540 clock or timer rate, and the central processing unit 540 load. These additional factors can provide a maximum synchronization time that is up to two orders of magnitude longer than the maximum synchronization time 240 for identical multicast packets transferred through the synchronization decoder circuit 510.

Compared to analyzers having communications packets, synchronization packets and control packets all transferred through the medium access controller 530, the dedicated synchronization decoder circuit 510 processes fewer types of data and a reduced volume of data. The synchronization decoder circuit 510 can be designed specifically for the decoding 330 and the local signal generating 340 functions. Therefore, these functions can be performed much more quickly by the synchronization decoder circuit 510.

Referring to FIG. 2 and FIG. 3, the time elapsed between when the first synchronized analyzer synchronization decoder circuit 510 completes receiving the multicast packet, $t_1$ 220, and when the first synchronized analyzer 410 synchronization decoder circuit 510 transmits local synchronization and control signals to the packet capture, analysis, and generation circuit 520, $t_3$ 250, is referred to as the decoder delay time 260. For some embodiments, the synchronization decoder circuit 510 decodes 330 the multicast packet and processes the multicast packet to generate 340 local synchronization and control signals within the decoder delay time 260. Note that the synchronization performed by the synchronization decoder circuit 510 and the control unit 110 according to this embodiment is for processes performed by the packet capture, analysis, and generation circuits 520 for each selected synchronized analyzer 410.

The decoder delay time 260 is essentially identical for all the synchronized analyzers 410. For some embodiments the decoder delay time 260 variation among the synchronized analyzers 410 is less than approximately five percent of the decoder delay time. The decoder delay time 260 for one embodiment of the invention including an Ethernet network having a speed in a range from 1 to 100 megabits per second is less than 100 nanoseconds. The decoder delay time 260 time is a function of the synchronization decoder circuit 510 architecture, the multicast packet size, and the required control and analysis for a particular monitored packet of data.

For some of the embodiments where the decoder delay time 260 variation is less than approximately five percent of the decoder delay time, the selected packet capture, analysis and generation circuits 520 of a first selected synchronized analyzer 410 start processing the monitored data packets at a first start time. The first start time differs from a start time corresponding to any other selected synchronized analyzer 410 by no more than a maximum synchronization time 240. The maximum synchronization time 240 comprises a parameter related to a smallest useful packet size and a network speed, and the maximum synchronization time is less than approximately one microsecond.

For some of the embodiments where the decoder delay time 260 variation is less than approximately five percent of the decoder delay time, the decoder synchronization circuit 510 of a first selected synchronized analyzer 410 transfers the local signals 515 to the selected packet capture, analysis and generation circuits 520 of the first synchronized analyzer at a first transfer time ($t_3$) 250. The selected synchronized analyzers 410 are adapted to ensure that the first transfer time 250 differs from the transfer time corresponding to any other selected synchronized analyzer by no more than a maximum synchronization time 240. This maximum difference holds for the last transfer time ($t_4$) 270 corresponding to the time when the synchronization decoder circuit 510 of the "last" synchronized analyzer 410 transfers the local signals 515 to the selected PCAGC's 520 thereof.

The next step of the method for synchronizing a distributed system 300 includes the synchronization decoder circuit 510 transferring 350 local signals to selected packet capture, analysis, and generation circuits 520. As indicated in FIG. 2, the decoder delay time 260 can be longer than the maximum synchronization time 240. However, the converse may also occur, where the decoder delay time 260 is shorter than the maximum synchronization time 240. For the latter relationship, the time when the first synchronized analyzer 410 synchronization decoder circuit 510 transfers 350 local signals 515 to the packet capture, analysis, and generation circuit 520, $t_3$ 250 will be prior to the time when the "last" synchronized analyzer completes reception of the multicast packet, $t_2$ 230.

For some embodiments, the communication packets are exchanged between the CPUs 540 of selected synchronized analyzers 410 and the control unit 110 through the selected synchronized analyzers' 410 medium access control 530 ports. The communication packets can include information transferred from the control unit 110 to all analyzers. The CPUs 540 receive the communication packets. For selected synchronization analyzers 410, the CPUs 540 respond to the communication packets by generating commands, and then transfer the commands to the PCAGC's 520. The selected PCAGC's 520 respond to the commands and the local signals 515 by processing monitored data packets, e.g., performing synchronization and control functions.

In the prior art, the CPU typically generates several "trigger signals" which trigger the analyzer to fetch monitored data packets. For some embodiments of the method for synchronizing a distributed system 300, the "trigger signals" are generated by the synchronization decoder circuit 510 in response to the multicast information from the control unit 110, and are included in the local signals 515.

For some embodiments, the next step of the method for synchronizing a distributed system 300 includes the selected packet capture, analysis, and generation circuit 520 beginning processing 360 of monitored data packets from monitored data streams at a start time. The distributed system can have monitored analysis locations in the monitored data streams 140, and each of the selected PCAGC's 520 is connected to one or more of the monitored analysis locations.

For some embodiments, the selected packet capture, analysis, and generation circuits 520 begin processing 360 of monitored data packets in response to the local signals 515 and the communication packets. The processing can be adapted to analyze and manage the distributed system. The steps discussed above provide a method for starting analysis processes in a synchronized manner.

In some embodiments, the data streams comprise transmitted data packets and include monitored data streams 140 selected for analysis at one or more monitored analysis locations.

In some embodiments, the selected packet capture, analysis and generating circuits 520 capture received monitored data packets at a monitored data receipt time. The selected packet capture, analysis and generating circuits 520 label 370 portions of the received monitored data packets with time-stamps to form time-stamped portions. The time-stamps correspond to the monitored data receipt times. The processing of the monitored data packets includes the selected packet capture, analysis and generation circuit analyzing the time-stamped portions where the analyzing includes generating analysis data. The processing of the monitored data packets also includes storing segments of the time-stamped portions and corresponding analysis data in a memory. In some of these embodiments, the distributed system includes a control unit 110 adapted to transmit the multicast information, and the method for synchronizing a distributed system 300 includes the selected packet capture, analysis and generating circuits 520 transmitting information corresponding to the analysis data to the control unit 110.

The use of separately addressed synchronization decoder circuits 510, enables the synchronized analyzers 410 to perform the decoding 330 of the multicast information and the generating 340 of the local signals 515 within a decoder delay time 260. For a first synchronized analyzer 410 completing the decoding 330 of the multicast information and the generating 340 of the local signals 515 in a decoder delay time 260, the selected packet capture, analysis, and generation circuits 520 start processing 360 of monitored data packets at a first start time. The first start time differs from a start time corresponding to any other synchronized analyzer 410 by less than the maximum synchronization time 240. Therefore, the analyzers are synchronized, and start processing "simultaneously" as defined herein.

The use of separate synchronization decoder circuits 510 for the distributed system synchronization method 100 ensures that the synchronization packets do not interfere with the normal management and control of the synchronized analyzer 410. Communication packets that do not require synchronization according to this invention's method are transmitted from the remote control link 420 and received by the Medium Access Controller (MAC) 530 corresponding to the synchronized analyzer 410. The MAC 530 passes the communication packets directly on to the central processing unit 540 of the synchronized analyzer 410 for normal processing, unaffected by the multicast packets.

The processing of monitored data packets begins with the PCAGC 520 processing resources capturing monitored data packets in response to the local signals 515 and the communication packets. Capturing can include reading, filtering, and partially storing the monitored data packets (e.g., header and address information). Filtering can include examining a byte or group of bytes, looking for a particular sequence of bits. When the sequence of bits is found, some action is triggered, such as time stamping, storage or analysis of portions of the monitored data packets.

The packet capture, analysis, and generation circuits 520 respond to the local signals 515 by: (1) capturing packets from the monitored data stream 140, (2) examining a byte or group of bytes in the captured packets looking for a particular sequence of bits, (3) responding to the captured packets and local signals 515 from the decoder circuit by labeling 370 portions of certain captured packets with time stamps, (4) storing segments of the time-stamped portions, (5) analyzing the time-stamped portions, and (6) generating and transmitting packets of analysis data to other synchronized analyzers 410 and the control unit 110. The analysis data generated by the PCAGC 520 is captured in a memory disposed in the PCAGC. Upon request from the control unit 110, the analysis data can be transferred to a memory portion of the central processing unit 540. The analysis data can then be transferred from the central processing unit 540 to the control unit 110 as needed.

As discussed above, the method for synchronizing a distributed system 300 can include the packet capture, analysis, and generation circuits 520 labeling 370 portions of received monitored data packets with time-stamps. Each received monitored data packet is captured by the packet capture, analysis, and generation circuit 520 at a monitored data receipt time. The time-stamp for a monitored data packet corresponds to the difference between the monitored data receipt time and the packet capture, analysis, and generation circuit 520 reset time. The method for synchronizing a distributed system 300 can include the packet capture, analysis, and generation circuits 520 processing 380 the time-stamped portions of the monitored data packets.

In some embodiments, the method for synchronizing a distributed system 300 includes, responsive to the multicast information and the communication packets, the packet capture, analysis and generation circuits 520 completing a first process for a first set of monitored data packets. The processing for each selected synchronized analyzer 410 completing at a corresponding end time.

The method for synchronizing a distributed system 300 can include the packet capture, analysis, and generation circuit 520 responding to the local signals 515 and any commands from the CPU 540 based on the communication packets by completing 390 the processing of the time-stamped portions of the monitored data packets. The completing 390 of the processing occurs when the packet capture, analysis, and generation circuit 520 completes a first process for a first set of monitored data packets. The processing for each synchronized analyzer 410 is completed at an end time.

In some embodiments, as described above, the decoding 330 of the multicast information and the generating 340 the local signals 515 are accomplished in a decoder delay time 260. The selected packet capture, analysis and generation circuits 520 of the first synchronized analyzer 410 completes processing of the monitored data packets at a first end time. The first end time differs from an end time corresponding to any other synchronized analyzer 410 by no more than a maximum synchronization time 240. The maximum synchronization time 240 comprises a parameter related to a smallest useful packet size and a network speed, and the maximum synchronization time is less than approximately one microsecond. Therefore, the synchronized analyzers 410 are synchronized, and complete processing of the first set of monitored data packets "simultaneously". This synchronization of end times implies that the transferring 350, labeling 370, and processing 380 are accomplished in essentially the same amount of time for each of the synchronized analyzers 410.

A specific embodiment of the invention will now be further described by the following, non-limiting example which will serve to illustrate in some detail various features of significance. The example is intended merely to facilitate an understanding of ways in which the invention may be practiced and to further enable those of skill in the art to practice the invention. Accordingly, the example should not be construed as limiting the scope of the invention. Some features of the specific embodiment are provided in more general terms to indicate that these features are more widely applicable.

For some embodiments of the invention, the multicast information comprises standard Ethernet packets. For the specific embodiment, the multicast information comprises decoder synchronization architecture (DSA) packets. The DSA packets are received by the synchronization decoder circuit 510 directly from the control unit 110, and can also be received by the CPU 540 directly from the control unit 110. But, CPU 540 processing of the DSA packets, if any, does not contribute to the synchronization of the processes performed by the packet capture, analysis and generation circuits 520.

The DSA packet format includes: a multicast address (e.g., 0x0160E6000010 for Shomiti multicast information), a destination address (DA), a source address (SA), e.g., a MAC address, corresponding to the sender of the multicast information, a packet type designation, a 32-bit arrangement of operation code flags, a checksum, padding, and an Ethernet frame checksum. Note that the content of the padding and the Ethernet frame checksum are typically ignored in the specific embodiment described herein.

The synchronized analyzers 410 process the Ethernet packet as described below. Synchronization decoder circuits 510 fetch (receive) packets having a data link layer destination address (DA) corresponding to the synchronized analyzer 410 multicast address. The PCAGC's 520 provide responses (e.g., analysis data) to the appropriate control unit 110 based on the source address (SA) MAC address of the sending control unit. Each multicast packet includes a packet type designation indicating that the packet is a type that corresponds to a particular series of analyzers having similar capabilities. For example, Shomiti Systems analyzers are indicated by a packet type designation of 0xBEEE.

Each multicast packet also includes a number of flag bits. For the specific embodiment, a 32-bit arrangement of operation code flags includes: a first bit to reset the system, a second bit to enable a receive operation, a third bit to enable a transmit operation, a fourth bit to clear corresponding time stamps, e.g., from monitored data packet portions labeled in a previous analysis sequence, and a fifth bit for remote triggering of analysis to be performed by the PCAGC's 520. Bits 6 through 23 are available for additional functionality but are not presently used in the specific embodiment.

Figure 7:
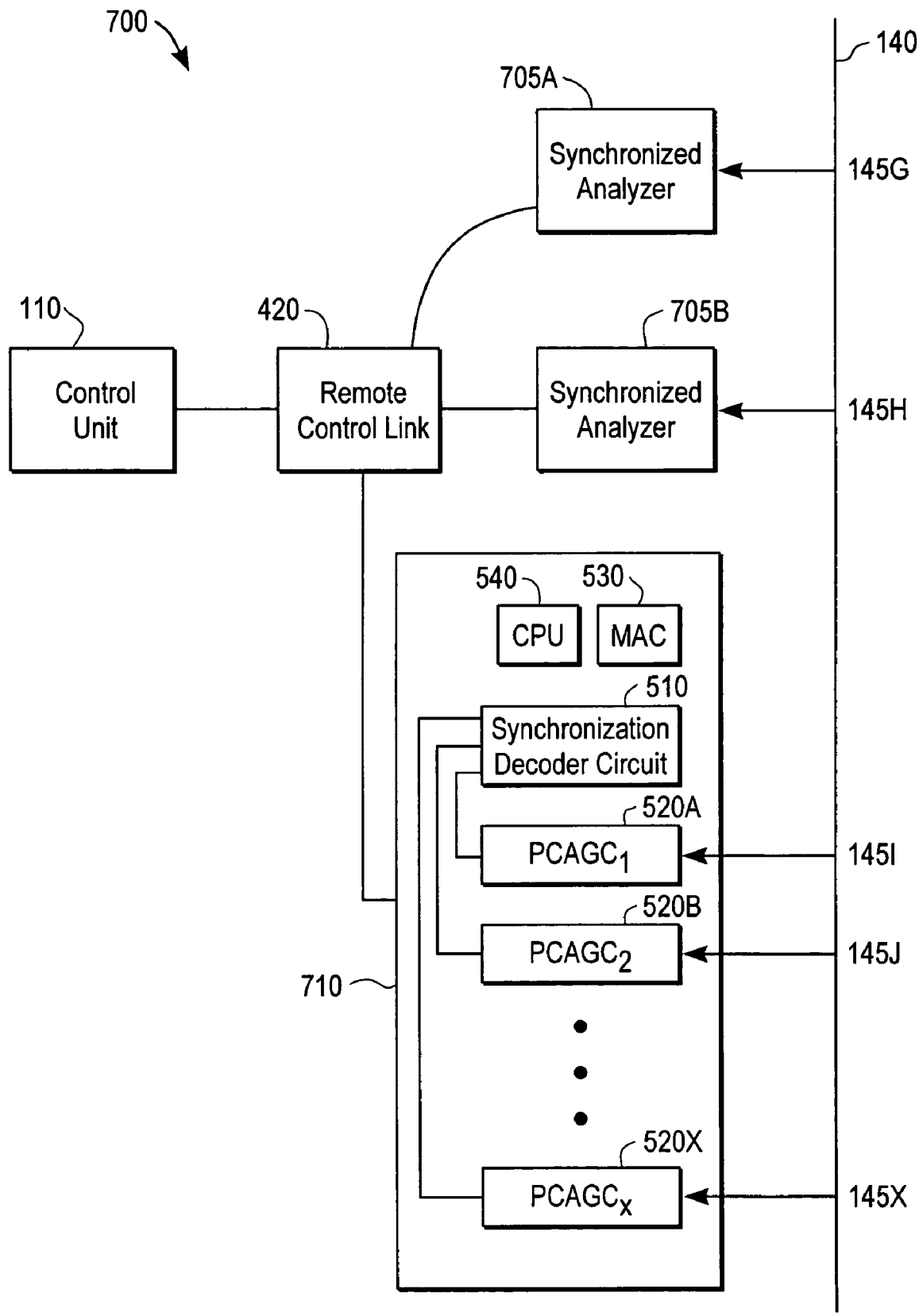
FIG. 7 illustrates a distributed system including a multiple monitored analysis location (multimal) analyzer according to one embodiment of the invention.
Figure 3:
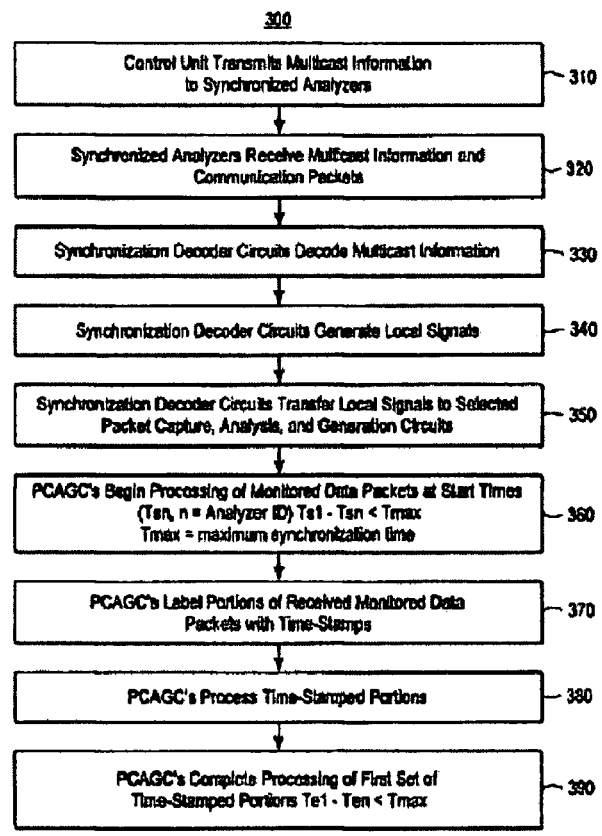
Figure 4:
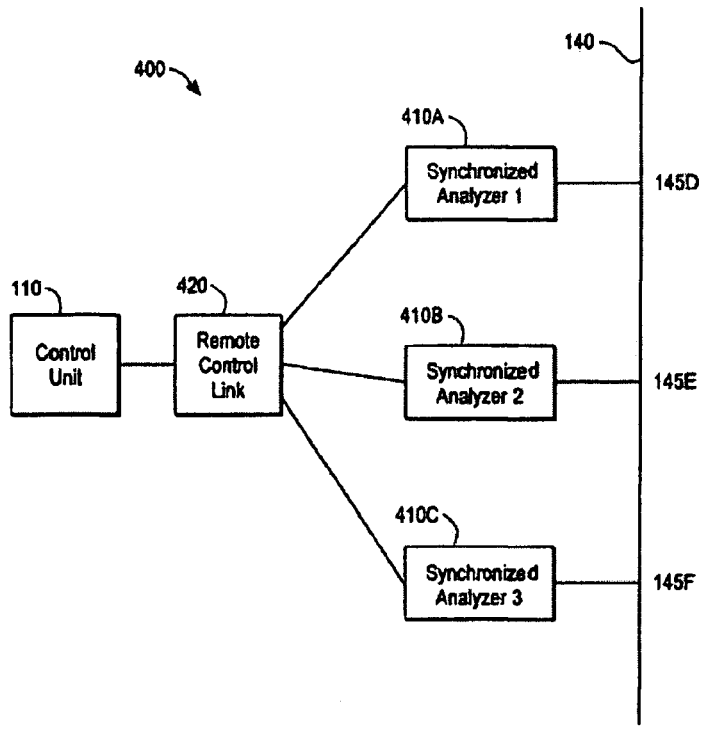

As shown in FIG. 7 and described below in the Analyzer for Synchronizing a Distributed System section, a multiple monitored analysis location (multimal) analyzer 710 can have a single CPU 540, one or more synchronization decoder circuits 510, and a plurality of PCAGC's 520 for analyzing a plurality of monitored analysis locations 145G–145K. The plurality of monitored analysis locations can be from different data streams, but are shown in FIG. 7 as being from a single monitored data stream 140.

For some embodiments of the invention, a plurality of operations address bits (8 in one embodiment of the invention) provide an operations address that determines which synchronized analyzers 410 in the system latch on to the multicast packets. Synchronized analyzer 410 software enables each synchronized analyzer to fetch (or latch on to) selected multicast messages based on the operations address bits. One address is used to provide broadcast messages that are accepted by all analyzers (0xFF for one embodiment). For one embodiment of the invention, upon power up of all the analyzers, the operations analyzer address for each analyzer is initialized to all zeroes (0x00). Also on power up, remotely activated reset occurs for synchronized analyzers 410 having software code providing for response to the multicast packets. Only synchronized analyzers 410 for which monitoring and management functions are planned in the initial cycle after power up are typically reset for a particular power up.

Analyzer for Synchronizing a Distributed System

A second aspect of the invention provides a synchronized analyzer 410 for synchronizing a distributed system. The synchronized analyzer 410 comprises a synchronization decoder circuit 510, and one or more packet capture, analysis and generation circuits 520. The synchronization decoder circuit 510 has processing resources adapted to receive and decode multicast information, and, responsive to the multicast information, generate local signals.

The packet capture, analysis and generation circuits 520 have processing resources adapted to receive the local signals 515 at signal receipt times. Responsive to local signals addressed to one or more selected packet capture, analysis and generation circuits 520, the processing resources thereof capture portions of monitored data packets at monitored data receipt times. The monitored data packets are transmitted in monitored data streams 140. The monitored data streams 140 are disposed in the distribution system and selected for analysis. The selection of which data streams and analysis locations are to be monitored can be made per an application running on a control unit 110, or by a user input to the control unit. Also in response to local signals 515 addressed to the selected packet capture, analysis and generation circuits 520 the processing resources thereof process portions of the monitored data packets. In some embodiments, the processing of the portions of the monitored data packets is adapted to analyze and manage the distributed system.

In some embodiments, the synchronized analyzer 410 includes a central processing unit 540 having processing resources adapted to receive communication packets from a control unit 110 disposed in the distributed system. Responsive to the communication packets, the CPU 540 processing resources are also adapted to generate commands and transfer the commands to the packet capture, analysis and generation circuits 520. The local signals 515 and the commands control the processing of the monitored data packets. In some of these embodiments, the distributed system includes a control unit 110 having processing resources adapted to generate and transmit the multicast information, and a remote control link 420 connecting the control unit to the synchronized analyzers 410, and connecting the synchronized analyzers to each other. For the embodiments including the control unit 110, the synchronized analyzer 410 includes a medium access controller 530. The central processing unit 540 processing resources are adapted to receive communications packets from the control unit 110 through the remote control link 420 and the medium access controller.

In some embodiments, the multicast information includes synchronization packets and control packets, and the local signals 515 include synchronization signals and control signals.

In some embodiments, the distributed system has analysis locations disposed in the data streams, and each packet capture, analysis and generation circuit 520 is connected to one or more analysis locations.

In some embodiments the synchronized analyzer 410 is connected to other synchronized analyzers in the distributed system and a control unit 110 via a first network link, otherwise referred to herein as a remote control link 420.

In some embodiments, the distributed system includes a control unit 110, and a remote control link 420. The control unit 110 has processing resources adapted to generate and transmit the multicast information. The remote control link 420 connects the control unit 110 to the synchronized analyzers 410, and connects the synchronized analyzers to each other. For these embodiments, the synchronization decoder circuit 510 processing resources are adapted to receive the multicast information from control unit 110 via the remote control link 420.

In some embodiments, the distributed system comprises an IEEE 802 compliant communications network.

In some embodiments, the synchronized analyzer 410 includes a medium access controller 530 having a first data link layer address, and a central processing unit 540 receiving the communication packets through the medium access controller. For these embodiments, the synchronization decoder circuit 410 has a second data link layer address, and the first data link layer address differs from the second data link layer address.

In some embodiments, the synchronized analyzer 410 comprises a single monitored analysis location analyzer having one or more packet capture, analysis and generation circuits 520 including processing resources adapted to capture monitored data packets from a single monitored analysis location.

In some embodiments, the synchronized analyzer 410 comprises a multiple monitored analysis location (multimal) analyzer 710 as shown in FIG. 7. The multimal analyzer has a plurality of packet capture, analysis and generation circuits 520. The plurality of packet capture, analysis and generation circuits 520 include processing resources adapted to capture monitored data packets from a plurality of monitored analysis locations. For example, in FIG. 7, a first multimal analyzer packet capture, analysis and generation circuit 520A captures monitored data packets from a first multimal analyzer PCAGC monitored data location 145I, a second multimal PCAGC 520B captures monitored data packets from a second multimal analyzer PCAGC monitored data location 145J, and an Xth multimal analyzer PCAGC 520C captures monitored data packets from an Xth multimal analyzer PCAGC monitored data location 145X.

For the multiple monitored analysis location (multimal) analyzers 710, individual PCAGC's 520 are addressed by the local signals 515, and only the addressed PCAGC's within a particular multimal analyzer 710 respond to the multicast information.

For such a multimal analyzer 710, a plurality of PCAGC 520 address bits [8 (bits 24 through 31) according to the specific embodiment of the invention] disposed in an operations code of a DSA packet provide an operations address that determines which PCAGC's 520 in the multimal analyzer 710 accept particular multicast packets. Synchronized analyzer 410 software enables each PCAGC 520 in the multimal analyzer 710 to process selected multicast messages based on the PCAGC address bits. Note that for the specific embodiment described herein, the 8 bit operations address provides for a maximum of two-hundred and fifty-five PCAGC's 520 for a given multimal analyzer 710.

One of the PCAGC addresses, 0xFF for the specific embodiment, is used to provide broadcast messages that are accepted by all of the multimal analyzer 710 PCAGC's 520. Upon global power up of all of the synchronized analyzers 410, all of the PCAGC 520 addresses are initialized to all zeroes (0x00) for one embodiment of the invention. Also, on power up of a particular multimal analyzer 710, remote reset occurs for PCAGC's 520 having a code providing for response to the appropriate multicast packets. In one embodiment, only synchronized analyzers 410 and PCAGC's 520 for which monitoring and management functions are planned in the initial cycle after power up are typically reset for a particular power up.

In some embodiments, the packet capture, analysis and generation circuits 520 include processing resources adapted to label portions of the received monitored data packets with time-stamps to form time-stamped portions. The time-stamps correspond to the monitored data receipt times. The processing of the monitored data packets includes analyzing the time-stamped portions. The analyzing includes generating analysis data, and storing segments of the time-stamped portions and corresponding analysis data in a memory. For some of these embodiments, the distributed system includes a control unit 110 having processing resources adapted to generate and transmit the multicast information, and a remote control link 420. The remote control link 420 connects the control unit 110 to the synchronized analyzers 410, and connects the synchronized analyzers to each other. The packet capture, analysis and generation circuit 520 processing resources are adapted to transmit analysis information corresponding to the analysis data to the control unit 110.

In some embodiments, the packet capture, analysis and generation circuits 520 have processing resources adapted to complete a first process for a first set of monitored data packets at a corresponding end time in response to the multicast information and the communication packets.

In some embodiments, the decoder synchronization circuit 510 processing resources are adapted to decode the multicast information and generate the local signals 515 within a decoder delay time 260. The variation of the decoder delay time 260 between synchronized analyzers 410 is less than approximately five percent of the decoder delay time.

In some embodiments, the synchronized analyzer 410 comprises a master analyzer including processing resources adapted to transmit the multicast information to synchronized analyzers 410 connected to the master analyzer.

System for Synchronizing a Distributed System

A third aspect of the invention is a system for synchronizing a distributed analysis system 400. The system for synchronizing a distributed system 400 comprises data streams including transmitted data packets, a control unit 110 having processing resources adapted to transmit multicast information, synchronized analyzers 410, and a first network link. The first network link is shown in FIG. 4, and otherwise referred to herein, as a remote control link 420. The synchronized analyzers 410 have the limitations and variations described above in the Analyzer for Synchronizing a Distributed System section. The remote control link 420 connects the control unit 110 to the synchronized analyzers 410, and connects the synchronized analyzers to each other. The control unit 110 processing resources transmit the multicast information to the synchronized analyzers 410 through the remote control link 420.

In some embodiments, the multicast information includes synchronization packets and control packets, and the local signals 515 include synchronization signals and control signals.

In some embodiments, the distributed system has analysis locations disposed in the data streams, and each packet capture, analysis and generation circuit 520 is connected to one or more of the analysis locations.

In some embodiments, the distributed system comprises an IEEE 802 compliant communications network. The distributed system can also comprise an Ethernet local area network where the remote control link 420 comprises an Ethernet repeater. The distributed system can also comprise a fiber distributed data interface network.

In some embodiments, the packet capture, analysis and generation circuits 520 include processing resources adapted to label portions of the received monitored data packets with time-stamps to form time-stamped portions. The time-stamps correspond to the monitored data receipt times. The processing of the monitored data packets includes analyzing the time-stamped portions. The analyzing includes generating analysis data, and storing segments of the time-stamped portions and corresponding analysis data in a memory. For some of these embodiments, the control unit 110 includes processing resources are adapted to generate the multicast information, and the packet capture, analysis and generation circuit 520 processing resources are adapted to transmit analysis information corresponding to the analysis data to the control unit.

In some embodiments, the decoder synchronization circuit 510 processing resources of a first synchronized analyzer 410 receive the multicast information at a first multicast receipt time ($t_1$ 220). The synchronized analyzers 410 are adapted to ensure that the first multicast receipt time 220 differs from the multicast receipt time corresponding to any other synchronized analyzer in the distributed system by no more than a maximum synchronization time 240. The maximum synchronization time 240 comprises a parameter related to a smallest useful packet size and a network speed. The maximum synchronization time 240 is less than approximately one microsecond.

In some embodiments, the packet capture, analysis and generation circuit 520 processing resources of a first synchronized analyzer 410 start processing the monitored data packets at a first start time. The first start time differs from a start time corresponding to any other synchronized analyzer 410 by no more than a maximum synchronization time 240.

In some embodiments, the decoder synchronization circuit 510 processing resources of a first synchronized analyzer transfers 350 the local signals 515 to selected packet capture, analysis and generation circuits 520 of the first synchronized analyzer 410 at a first transfer time ($t_3$). The synchronized analyzers 410 are adapted to ensure that the first transfer time differs from the transfer time corresponding to any other synchronized analyzer 410 in the distributed system by no more than a maximum synchronization time 240.

In some embodiments, one of the synchronized analyzers comprises a master analyzer including processing resources adapted to transmit the multicast information to synchronized analyzers 410 connected to the master analyzer.

The synchronization system can comprise a multiple monitored analysis location analyzer 710 distributed system 700 as shown in FIG. 7. For some of these embodiments, the synchronized analyzers 410 comprise single monitored analysis location analyzers and multiple monitored analysis location analyzers 710 as shown in FIG. 7. The first single monitored analysis location analyzer 705A has one or more packet capture, analysis and generation circuits 520 that capture monitored data packets from a first single monitored analysis location analyzer monitored analysis location 145G. The second single monitored analysis location analyzer 705A has one or more packet capture, analysis and generation circuits 520 that capture monitored data packets from a second single monitored analysis location analyzer monitored analysis location 145H.

The multiple monitored analysis location (multimal) analyzers 710 have a plurality of packet capture, analysis and generation circuits where the plurality of packet capture, analysis and generation circuits capture monitored data packets from a plurality of monitored analysis locations. As discussed below in the Synchronized Analyzer section, for the multiple monitored analysis location (multimal) analyzers 710, individual PCAGC's 520 are addressed by the local signals 515, and only the addressed PCAGC's within a particular multimal analyzer 710 respond to the multicast information.

All the disclosed embodiments of the invention described herein can be realized and practiced without undue experimentation. Although the best mode of carrying out the invention contemplated by the inventor is disclosed above, practice of the invention is not limited thereto. Accordingly, it will be appreciated by those skilled in the art that the invention may be practiced otherwise than as specifically described herein.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended claims.

What is claimed is:

1. A method for synchronizing a distributed system, the distributed system having synchronized analyzers, and data streams, the distributed system supporting multicast communications, the method comprising:

selected synchronized analyzers receiving from a control unit within the distributed system under analysis multicast information and communication packets over a network connection of the distributed system, each selected synchronized analyzer having processing resources including a synchronization decoder circuit, and one or more packet capture, analysis and generation circuits, the multicast information including synchronization information, control information, or both, and destination data corresponding to addresses of the selected synchronized analyzers;

each of the synchronization decoder circuits decoding the multicast information;

responsive to the multicast information, each of the synchronization decoder circuits generating local signals;

each of the synchronization decoder circuits transferring the local signals to the one or more selected packet capture, analysis and generation circuits;

responsive to the local signals, using each of the selected packet capture, analysis and generation circuits to simultaneously analyze at least a portion of the data streams received over the network connection for which the multicast information was received;

based on the analysis of the data streams, generating analysis data; and sending the analysis data to the control unit over the network connection used to send the multicast information, the analysis data corresponding to the analysis of the data streams for the network.

2. The method of claim 1, wherein:

the data streams comprise transmitted data packets and include monitored data streams selected for analysis at one or more monitored analysis locations; and the method includes, responsive to the local signals and the communication packets, the selected packet capture, analysis and generation circuits beginning processing of monitored data packets from monitored data streams at a start time.

3. The method of claim 2, wherein the method includes:

the selected packet capture, analysis and generating circuits capturing received monitored data packets at a monitored data receipt time;

the selected packet capture, analysis and generating circuits labeling portions of the received monitored data packets with time-stamps to form time-stamped portions, the time-stamps corresponding to the monitored data receipt times; and the processing of the monitored data packets includes the selected packet capture, analysis and generation circuits;

analyzing the time-stamped portions, the analyzing including generating analysis data; and storing segments of the time-stamped portions and corresponding analysis data in a memory.

4. The method of claim 2, wherein the processing is adapted to analyze and manage the distributed system.

5. The method of claim 2, wherein the method includes, responsive to the multicast information and the communication packets, the packet capture, analysis and generation circuits completing a first process for a first set of monitored data packets, the processing for each selected synchronized analyzer completing at a corresponding end time.

6. The method of claim 1, wherein:
the multicast information includes synchronization packets and control packets; and the local signals include synchronization signals and control signals.

7. The method of claim 1, wherein:
the distributed system has analysis locations disposed in the data streams; and
each of the selected packet capture, analysis and generation circuits connected to one or more monitored analysis locations.

8. The method of claim 1, wherein the synchronized analyzer processing resources include a central processing unit and the method includes:
the central processing unit receiving the communication packets;
responsive to the communication packets, the central processing unit generating commands; and
the central processing unit sending the commands to the packet capture, analysis and generation circuits.

9. The method of claim 1, wherein: the distributed system includes:
a medium access controller and a central processing unit included in the synchronized analyzer;
and the method includes:
the control unit transmitting the communications packets through the network connection and the medium access controller to the central processing units of the selected synchronized analyzers.

10. The method of claim 9, wherein the control unit comprises a separate control computer.

11. The method of claim 9, wherein the control unit comprises a master analyzer.

12. The method of claim 1, wherein the distributed system comprises an Ethernet network including the network link connecting the synchronized analyzers to the control unit and the synchronized analyzers to each other, the network link comprises an Ethernet repeater.

13. The method of claim 1, wherein the distributed system comprises an IEEE 802 compliant communications network.

14. The method of claim 1, wherein:
the data streams comprise transmitted data packets and include monitored data streams selected for analysis at one or more monitored analysis locations; and
the synchronized analyzers comprise:
single monitored analysis location synchronized analyzers having one or more packet capture, analysis and generation circuits capturing monitored data packets from a single monitored analysis location; and
multiple monitored analysis location analyzers having a plurality of packet capture, analysis and generation circuits, the plurality of packet capture, analysis and generation circuits capturing monitored data packets from a plurality of monitored analysis locations.

15. The method of claim 1, wherein:
the synchronized analyzer processing resources include:
a medium access controller having a first data link layer address; and
a central processing unit receiving the communications packets through the medium access controller; and
the synchronization decoder circuit has a second data link layer address, the first data link layer address differs from the second data link layer address.

16. The method of claim 1, wherein the local signals include one or more of a reset signal, a receive enable signal, a transmit enable signal, a clear time stamp signal, or a remote trigger signal.

17. A synchronized analyzer for synchronizing a distributed system comprising:
a control unit having processing resources adapted to:
send multicast information and communication packets over a network connection of the distributed system to be analyzed;
a synchronization decoder circuit having processing resources adapted to:
receive and decode the multicast information received over the network connection of the distributed system to be analyzed;
responsive to the multicast information, generate local signals; and
one or more packet capture, analysis and generation circuits having processing resources adapted to:
receive the local signals at signal receipt times; and
responsive to local signals addressed to one or more selected packet capture, analysis and generation circuits:
capture portions of monitored data packets received over the network connection at monitored data receipt times, the monitored data packets transmitted in monitored data streams, the monitored data streams disposed in the distribution system and selected for analysis;
simultaneously process and analyze portions of the monitored data packets with other packet capture, analysis and generation circuits that receive the multicast information over the network connections;
based on the analysis of the portions of the monitored data packets, generate analysis data; and
send the analysis data to the control unit over the network connection used to send the multicast information, the analysis data corresponding to the analysis of the portions of the monitored data packets.

18. The synchronized analyzer of claim 17, including a central processing unit having processing resources adapted to:
receive the communication packets from the control unit disposed in the distributed system; and
responsive to the communication packets, generate commands; and
transfer the commands to the packet capture, analysis and generation circuits, the local signals and the commands controlling the processing of the monitored data packets.

19. The synchronized analyzer of claim 17, wherein:
the multicast information includes synchronization packets and control packets; and the local signals include synchronization signals and control signals.

20. The synchronized analyzer of claim 17, wherein:
the distributed system has analysis locations disposed in the data streams; and each packet capture, analysis and generation circuit connected to one or more analysis locations.

21. The synchronized analyzer of claim 17, wherein the synchronized analyzer is connected to other synchronized analyzers in the distributed system and the control unit via the network connection.

22. The synchronized analyzer of claim 17, wherein the distributed system comprises an IEEE 802 compliant communications network.

23. The synchronized analyzer of claim 17, wherein:
the multicast information includes destination data corresponding to addresses of selected synchronized analyzers;
the synchronized analyzer includes:
a medium access controller having a first data link layer address, and
a central processing unit receiving data through the medium access controller;
the synchronization decoder circuit has a second data link layer address, the destination data corresponds to the second data link layer address; and
the first data link layer address differs from the second data link layer address.

24. The synchronized analyzer of claim 17 comprising a single monitored analysis location synchronized analyzer having one or more packet capture, analysis and generation circuits including processing resources adapted to capture monitored data packets from a single monitored analysis location.

25. The synchronized analyzer of claim 17, wherein:
the packet capture, analysis and generation circuits include processing resources adapted to label portions of the received monitored data packets with time-stamps to form time-stamped portions, the time-stamps corresponding to the monitored data receipt times; and
the processing of the monitored data packets includes:
analyzing the time-stamped portions, the analyzing including generating analysis data; and
storing segments of the time-stamped portions and corresponding analysis data in a memory.

26. The synchronized analyzer of claim 17, wherein the packet capture, analysis and generation circuits have processing resources adapted to complete a first process for a first set of monitored data packets at a corresponding end time in response to the multicast information and the communication packets.

27. The synchronized analyzer of claim 17, wherein the decoder synchronization circuit processing resources adapted to decode the multicast information and generate the local signals within a decoder delay time, the variation of the decoder delay time between synchronized analyzers is less than approximately five percent of the decoder delay time.

28. The synchronized analyzer of claim 17, comprising a master analyzer including processing resources adapted to transmit the multicast information to synchronized analyzers connected to the master analyzer.

29. A system for synchronizing a distributed system, comprising:
data streams comprising transmitted data packets;
a control unit having processing resources adapted to generate and transmit multicast information over a network connection of the distributed system under analysis, the multicast information including synchronization information, control information, or both;
synchronized analyzers including:
synchronization decoder circuits having processing resources adapted to: receive and decode the multicast information;
responsive to the multicast information, generate local signals; and one or more packet capture, analysis and generation circuits having processing resources adapted to:
receive the local signals at signal receipt times; and
responsive to local signals addressed to one or more selected packet capture, analysis and generation circuits:
capture from the network connection portions of monitored data packets from data streams selected for analysis at monitored data receipt times, and
label portions of the received monitored data packets with time-stamps to form time-stamped portions, the time-stamps corresponding to the monitored data receipt times;
process the portions of the monitored data packets, the processing of the portions of the monitored data packets adapted to analyze and manage the distributed system;
a first network link connecting the control unit to the synchronized analyzers and the synchronized analyzers to each other, the control unit processing resources transmit the multicast information over the network connection to the synchronized analyzers through the first network link; and
the analyzing including:
generate analysis data:
store segments of the time-stamped portions and corresponding analysis data in a memory; and
transmit analysis information corresponding to the analysis data to the control unit.

30. The system of claim 29, wherein:
the multicast information includes synchronization packets and control packets; and the local signals include synchronization signals and control signals.

31. The system of claim 29, wherein:
the distributed system has analysis locations disposed in the data streams; and each packet capture, analysis and generation circuit connected to one or more of the analysis locations.

32. The system of claim 29, wherein the synchronized analyzers include a central processing unit having processing resources adapted to:
receive communication packets from the control unit via the first network link; responsive to the communication packets, generate commands; and
transfer the commands to the packet capture, analysis and generation circuits, the local signals and the commands controlling processing of monitored data packets.

33. The system of claim 29, wherein the distributed system comprises an Ethernet local area network and the first network link comprises an Ethernet repeater.

34. The system of claim 29, wherein the distributed system comprises an IEEE 802 compliant communications network.

35. The system of claim 29, wherein the distributed system comprises a fiber distributed data interface network.

36. The system of claim 29, wherein:
the multicast information includes destination data corresponding to addresses of selected synchronized analyzers;
the synchronized analyzer includes:
  a medium access controller having a first data link layer address, and
  a central processing unit receiving data through the medium access controller; the synchronization decoder circuit has a second data link layer address, the destination data corresponds to the second data link layer address; and the first data link layer address differs from the second data link layer address.

37. The system of claim 29, wherein the synchronized analyzers include single monitored analysis location analyzers, each of the single monitored analysis location analyzers having one or more packet capture, analysis and generation circuits capturing monitored data packets from a single monitored analysis location.

38. The system of claim 29, wherein the decoder synchronization circuit processing resources adapted to decode the multicast information and generate the local signals steps within a decoder delay time, the variation of the decoder delay time between synchronized analyzers is less than approximately five percent of the decoder delay time.

39. The system of claim 29, wherein one of the synchronized analyzers comprises a master analyzer including processing resources adapted to transmit the multicast information to synchronized analyzers connected to the master analyzer.

40. A method for synchronizing a distributed system, the distributed system having synchronized analyzers, and data streams, the distributed system supporting multicast communications, the method comprising:

selected synchronized analyzers receiving the multicast information and communication packets, each selected synchronized analyzer having processing resources including a synchronization decoder circuit, and one or more packet capture, analysis and generation circuits, the multicast information including synchronization packets, control packets and destination data corresponding to addresses of the selected synchronized analyzers, and the multicast information received from a control unit via a network link common to each selected synchronized analyzer and within the distributed system to be analyzed;

the synchronization decoder circuit decoding the multicast information;

responsive to the multicast information, the synchronization decoder circuit generating local signals, the local signals include synchronization signals and control signals; and the synchronization decoder circuit transferring the local signals to the one or more selected packet capture, analysis and generation circuits;

responsive to the local signals, using the one or more selected packet capture, analysis and generation circuits to analyze the data streams; and sending to the control unit analyze data over the network link common to each selected synchronized analyzer.

41. The method of claim 40, wherein the controls signals are one or more of a system reset signal, a receive enable signal, a transmit enable signal, a clear time stamp signal, or a remote trigger signal.

42. The method of claim 40, wherein the control unit is one of the selected synchronized analyzers.

* * * * *

UNITED STATES PATENT AND TRADEMARK OFFICE
CERTIFICATE OF CORRECTION

PATENT NO. : 7,120,121 B2
APPLICATION NO. : 10/176516
DATED : October 10, 2006
INVENTOR(S) : Sikdar It is certified that error appears in the above-identified patent and that said Letters Patent is hereby corrected as shown below:

Drawings
Sheet 1, replace FIG. 1 with the figure depicted herein below, wherein the label "100" has been added.

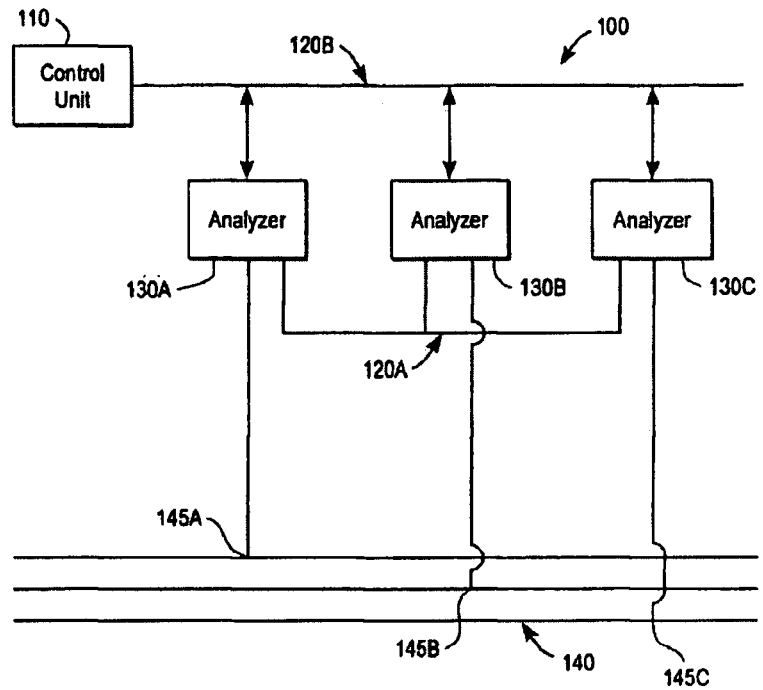

FIG. 1

Signed and Sealed this

Seventh Day of December, 2010

David J. Kappos
*Director of the United States Patent and Trademark Office*

Drawings

Sheet 3, replace FIG. 3 with the figure depicted herein below, wherein the label "300" has been added.

Drawings
Sheet 4, replace FIG. 4 with the figure depicted herein below, wherein all the instances of "Synchronizer" have been changed to --Synchronized--

Column 7
Line 44, remove [100]

Column 12
Line 54, change "$t_{max}$-b/s" to --$t_{max}$=b/s--

Column 15
Line 14, remove [100]

Column 17
Line 27, change "145G-145K" to --145G-145X--

Column 19
Line 4, after "The multimal analyzer", insert --710--
Line 14, change "1451" to --145I--